US012038606B2

(12) United States Patent
Hashiya et al.

(10) Patent No.: US 12,038,606 B2
(45) Date of Patent: Jul. 16, 2024

(54) OPTICAL DEVICE AND PHOTODETECTION SYSTEM

(71) Applicant: Panasonic Intellectual Property Management Co., Ltd., Osaka (JP)

(72) Inventors: Akira Hashiya, Osaka (JP); Yasuhisa Inada, Osaka (JP); Masanori Era, Kumamoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 330 days.

(21) Appl. No.: 17/488,391

(22) Filed: Sep. 29, 2021

(65) Prior Publication Data

US 2022/0019022 A1   Jan. 20, 2022

Related U.S. Application Data

(63) Continuation of application No. PCT/JP2020/016394, filed on Apr. 14, 2020.

(30) Foreign Application Priority Data

May 9, 2019   (JP) .................. 2019-089232

(51) Int. Cl.
   *G02B 6/12*       (2006.01)
   *G01S 7/481*      (2006.01)
   *G02B 6/124*      (2006.01)
(52) U.S. Cl.
   CPC ............ *G02B 6/124* (2013.01); *G01S 7/4817* (2013.01)
(58) Field of Classification Search
   CPC ............................. G02B 6/124; G01S 7/4817
   (Continued)

(56) References Cited

U.S. PATENT DOCUMENTS

| 5,305,336 A * | 4/1994 | Adar ................... H04B 10/504 |
| | | 372/18 |
| 2008/0107372 A1 | 5/2008 | Fujimori et al. |

(Continued)

FOREIGN PATENT DOCUMENTS

| JP | 10-233528 | 9/1998 |
| JP | 11-087767 | 3/1999 |

(Continued)

OTHER PUBLICATIONS

The Extended European Search Report dated May 30, 2022 for the related European Patent Application No. 20802445.5.

(Continued)

*Primary Examiner* — Jerry M Blevins
(74) *Attorney, Agent, or Firm* — Rimon P.C.

(57) ABSTRACT

An optical device includes a first mirror having a first reflecting surface and extending along a first direction, a second mirror having a second reflecting surface that faces the first reflecting surface and extending along the first direction, and an optical waveguide layer, located between the first mirror and the second mirror, that causes light to propagate along the first direction. A transmittance of the first mirror is higher than a transmittance of the second mirror. A reflection spectrum of at least either the first mirror or the second mirror with respect to light arriving from a direction normal to the reflecting surface includes, in a wavelength region in which a reflectance is higher than or equal to 90%, a local maximum point and first and second points of inflection located closer to a long-wavelength side than the local maximum point.

8 Claims, 12 Drawing Sheets

(58) Field of Classification Search
USPC .......................................................... 385/37
See application file for complete search history.

(56) References Cited

U.S. PATENT DOCUMENTS

| | | | |
|---|---|---|---|
| 2012/0230352 A1* | 9/2012 | Minelly | .............. H01S 3/09415 |
| | | | 372/6 |
| 2018/0267150 A1 | 9/2018 | Nada et al. | |
| 2019/0391245 A1* | 12/2019 | Mori | ..................... G01S 7/4817 |

FOREIGN PATENT DOCUMENTS

| | | | |
|---|---|---|---|
| JP | 2005-227324 A | | 8/2005 |
| JP | 2006-047872 | | 2/2006 |
| JP | 2006-220746 A | | 8/2006 |
| JP | 2013-016591 | | 1/2013 |
| JP | 2013016591 A | * | 1/2013 ............. H01S 5/183 |
| JP | 2014-145935 | | 8/2014 |
| JP | 2016-508235 | | 3/2016 |
| JP | 2018-128663 | | 8/2018 |
| JP | 2018-156059 | | 10/2018 |
| WO | 2013/168266 | | 11/2013 |
| WO | 2014/110017 | | 7/2014 |

OTHER PUBLICATIONS

Xiaodong Gu et al: "Electro-Thermal Beam Steering Using Bragg Reflector Waveguide Amplifier", Japanese Journal of Applied Physics, vol. 51, Feb. 1, 2012 (Feb. 1, 2012), pp. 020206-1, XP055537237.
International Search Report of PCT application No. PCT/JP2020/016394 dated Jul. 21, 2020.
Toshihiro Kato et al., "Development of Infrared Point-source Light Emitting Diodes with a Distributed Bragg Reflector", Materia Japan, vol. 36, 5, 1997, pp. 514-516 (Partial Translation).

* cited by examiner

OPTICAL DEVICE AND PHOTODETECTION SYSTEM

BACKGROUND

1. Technical Field

The present disclosure relates to an optical device and a photodetection system.

2. Description of the Related Art

There have conventionally been proposed various types of device that are capable of scanning space with light.

International Publication No. 2013/168266 discloses a configuration in which an optical scan can be performed with a mirror-rotating driving apparatus.

Japanese Unexamined Patent Application Publication (Translation of PCT Application) No. 2016-508235 discloses an optical phased array having a plurality of two-dimensionally arrayed nanophotonic antenna elements. Each antenna element is optically coupled to a variable optical delay line (i.e. a phase shifter). In this optical phased array, a coherent light beam is guided to each antenna element by a waveguide, and the phase of the light beam is shifted by the phase shifter. This makes it possible to vary the amplitude distribution of a far-field radiating pattern.

Japanese Unexamined Patent Application Publication No. 2013-16591 discloses an optical deflection element including: a waveguide including an optical waveguide layer through the inside of which light is guided and first distributed Bragg reflectors formed on upper and lower surfaces, respectively, of the optical waveguide layer; a light entrance through which light enters the waveguide, and a light exit formed on a surface of the waveguide to let out light having entered through the light entrance and being guided through the inside of the waveguide.

SUMMARY

One non-limiting and exemplary embodiment provides a novel optical device that is capable of achieving an optical scan through a comparatively simple configuration.

Solution to Problem

In one general aspect, the techniques disclosed here feature an optical device including a first mirror having a first reflecting surface and extending along a first direction, a second mirror having a second reflecting surface that faces the first reflecting surface and extending along the first direction, and an optical waveguide layer, located between the first mirror and the second mirror, that causes light to propagate along the first direction. A transmittance of the first mirror is higher than a transmittance of the second mirror. A reflection spectrum of at least either the first mirror or the second mirror with respect to light arriving from a direction normal to the reflecting surface includes, in a wavelength region in which a reflectance is higher than or equal to 90%, a local maximum point and first and second points of inflection located closer to a long-wavelength side than the local maximum point.

It should be noted that general or specific embodiments may be implemented as a device, a system, a method, or any selective combination thereof.

One aspect of the present disclosure makes it possible to achieve an optical one-dimensional scan or two-dimensional scan through a comparatively simple configuration.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
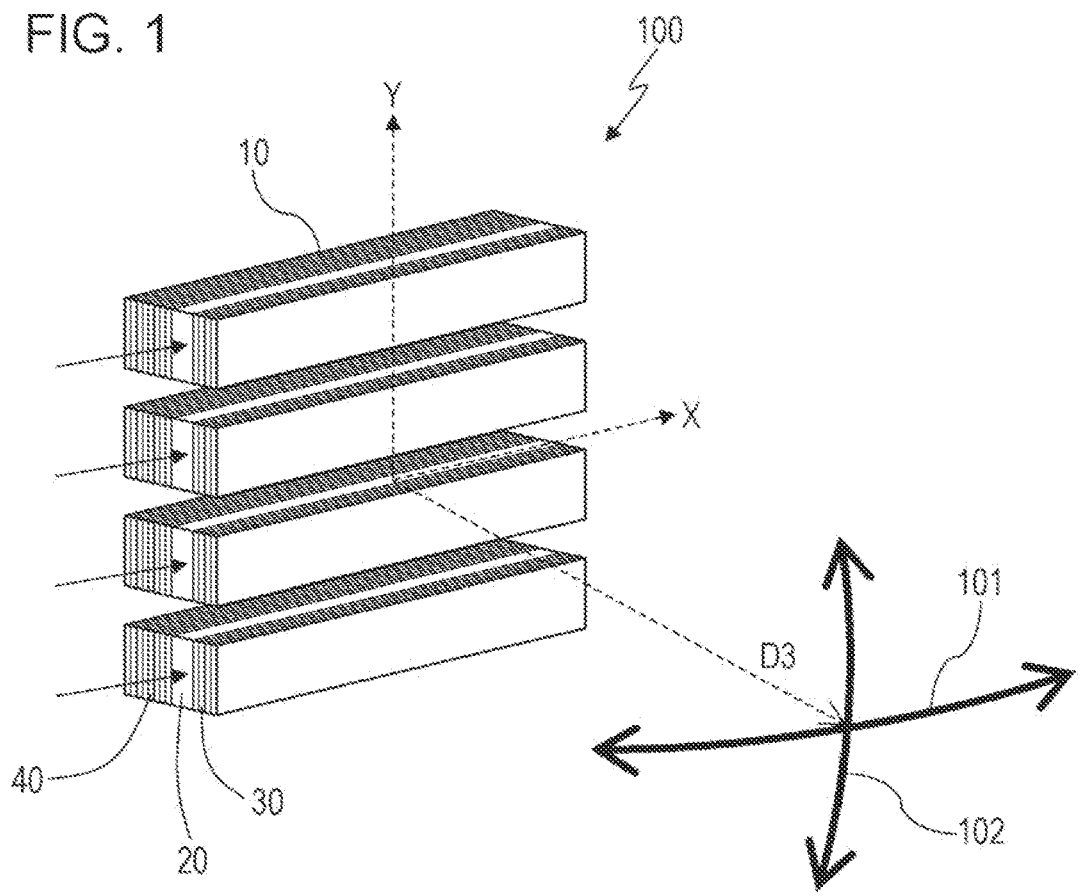
FIG. 1 is a perspective view schematically showing an example of an optical scan device.

Prior to a description of embodiments of the present disclosure, underlying knowledge forming the basis of the present disclosure is described.

The inventor found that a conventional optical scan device has difficulty in scanning space with light without making a complex apparatus configuration.

For example, the technology disclosed in International Publication No. 2013/168266 requires a mirror-rotating driving apparatus. This undesirably makes a complex apparatus configuration that is not robust against vibration.

In the optical phased array described in Japanese Unexamined Patent Application Publication (Translation of PCT Application) No. 2016-508235, it is necessary to divide light into lights, introduce the lights into a plurality of column waveguide and a plurality of row waveguides, and guide the lights to the plurality of two-dimensionally arrayed antenna elements. This results in very complex wiring of optical waveguides through which to guide the lights. This also makes it impossible to attain a great two-dimensional scanning range. Furthermore, to two-dimensionally vary the amplitude distribution of emitted light in a far field, it is necessary to connect phase shifters separately to each of the plurality of two-dimensionally arrayed antenna elements and attach phase-controlling wires to the phase shifters. This causes the phases of lights falling on the plurality of two-dimensionally arrayed antenna elements to vary by a different amount. This makes the elements very complex in configuration.

The inventor focused on the foregoing problems in the conventional technologies and studied configurations to solve these problems. The inventor found that the foregoing problems can be solved by using an optical waveguide element having a pair of mirrors facing each other and an optical waveguide layer sandwiched between the mirrors. One of the pair of mirrors of the optical waveguide element has a higher light transmittance than the other and lets out a portion of light propagating through the optical waveguide layer. As will be mentioned later, the direction of light emitted (or the angle of emission) can be changed by adjusting the refractive index or thickness of the optical waveguide layer or the wavelength of light that is inputted to the optical waveguide layer. More specifically, by changing the refractive index, the thickness, or the wavelength, a component constituting the wave number vector (wave vector) of the emitted light and acting in a direction along a lengthwise direction of the optical waveguide layer can be changed. This allows a one-dimensional scan to be achieved.

Furthermore, in a case where an array of a plurality of the optical waveguide elements is used, a two-dimensional scan can be achieved. More specifically, a direction in which lights going out from the plurality of optical waveguide elements reinforce each other can be changed by giving an appropriate phase difference to lights that are supplied to the plurality of optical waveguide elements and adjusting the phase difference. A change in phase difference brings about a change in a component constituting the wave number vector of the emitted light and acting in a direction that intersects the direction along the lengthwise direction of the optical waveguide layer. This makes it possible to achieve a two-dimensional scan. Even in a case where a two-dimensional scan is performed, it is not necessary to cause the refractive index or thickness of each of a plurality of the optical waveguide layers or the wavelength of light to vary by a different amount. That is, a two-dimensional scan can be performed by giving an appropriate phase difference to lights that are supplied to the plurality of optical waveguide layers and causing at least one of the refractive index of each of the plurality of optical waveguide layers, the thickness of each of the plurality of optical waveguide layers, or the wavelength to vary by the same amount in synchronization.

In this way, the present disclosure makes it possible to achieve an optical one-dimensional or two-dimensional scan through a comparatively simple configuration.

The phrase "at least one of the refractive index, the thickness, or the wavelength" herein means at least one selected from the group consisting of the refractive index of an optical waveguide layer, the thickness of an optical waveguide layer, and the wavelength of light that is inputted to an optical waveguide layer. For a change in direction of emission of light, any one of the refractive index, the thickness, and the wavelength may be controlled alone. Alternatively, the direction of emission of light may be changed by controlling any two or all of these three. The wavelength of light that is inputted to the optical waveguide layer may be controlled instead of or in addition to controlling the refractive index or the thickness.

The foregoing fundamental principles are similarly applicable to uses in which optical signals are received as well as uses in which light is emitted. The direction of light that can be received can be one-dimensionally changed by changing at least one of the refractive index, the thickness, or the wavelength. Furthermore, the direction of light that can be received can be two-dimensionally changed by changing a phase difference of light through a plurality of phase shifters connected separately to each of a plurality of unidirectionally-arrayed waveguide elements.

An optical scan device and an optical receiver device of the present disclosure may be used, for example, as an antenna in a photodetection system such as a LiDAR (light detection and ranging) system. The LiDAR system, which involves the use of short-wavelength electromagnetic waves (visible light, infrared radiation, or ultraviolet radiation), can detect a distance distribution of objects with higher resolution than a radar system that involves the use of radio waves such as millimeter waves. Such a LiDAR system is mounted, for example, on a movable body such as an automobile, a UAV (unmanned aerial vehicle, i.e. a drone), or an AGV (automated guided vehicle), and may be used as one of the crash avoidance technologies. The optical scan device and the optical receiver device are herein sometimes collectively referred to as "optical device". Further, a device that is used in the optical scan device or the optical receiver device is sometimes referred to as "optical device", too. The term "optical device" is also used to refer to an optical component that constitutes the optical scan device or the optical receiver device.

Example Configuration of Optical Scan Device

The following describes, as an example, a configuration of an optical scan device that performs a two-dimensional scan. Note, however, that an unnecessarily detailed description may be omitted. For example, a detailed description of a matter that is already well known and a repeated description of substantially the same configuration may be omitted. This is intended to facilitate understanding of persons skilled in the art by avoiding making the following description unnecessarily redundant. It should be noted that the inventors provide the accompanying drawings and the following description for persons skilled in the art to fully understand the present disclosure and do not intend to limit the subject matter recited in the claims. In the following description, identical or similar constituent elements are given the same reference numerals.

In the present disclosure, the term "light" means electromagnetic waves including ultraviolet radiation (ranging from approximately 10 nm to approximately 400 nm in wavelength) and infrared radiation (ranging from approximately 700 nm to approximately 1 mm in wavelength) as well as visible light (ranging approximately 400 nm to approximately 700 nm in wavelength). Ultraviolet radiation is herein sometimes referred to as "ultraviolet light", and infrared radiation is herein sometimes referred to as "infrared light".

In the present disclosure, an optical "scan" means changing the direction of light. A "one-dimensional scan" means changing the direction of light along a direction that intersects the direction. A "two-dimensional scan" means two-dimensionally changing the direction of light along a plane that intersects the direction.

FIG. 1 is a perspective view schematically showing an example of an optical scan device 100. The optical scan device 100 includes a waveguide array including a plurality of waveguide elements 10. Each of the plurality of waveguide elements 10 has a shape extending in a first direction (in FIG. 1, an X direction). The plurality of waveguide elements 10 are regularly arrayed in a second direction (in FIG. 1, a Y direction) that intersects the first direction. The plurality of waveguide elements 10, while propagating light in the first direction, emit the light in a third direction D3 that intersects an imaginary plane parallel to the first and second directions. Although, in the present disclosure, the first direction (X direction) and the second direction (Y direction) are orthogonal to each other, they may not be orthogonal to each other. Although, in the present disclosure, the plurality of waveguide elements 10 are placed at equal spacings in the Y direction, they do not necessarily need to be placed at equal spacings.

It should be noted that the orientation of a structure shown in a drawing of the present disclosure is set in view of understandability of explanation and is in no way intended to restrict any actual orientation whatsoever. Further, the shape and size of the whole or a part of a structure shown in a drawing are not intended to restrict an actual shape and size.

Each of the plurality of waveguide elements 10 has first and second mirrors 30 and 40 (each hereinafter sometimes referred to simply as "mirror") facing each other and an optical waveguide layer 20 located between the mirror 30 and the mirror 40. Each of the mirrors 30 and 40 has a reflecting surface, situated at the interface with the optical waveguide layer 20, that intersects the third direction D3. The mirror 30, the mirror 40, and the optical waveguide layer 20 have shapes extending in the first direction (X direction).

The reflecting surface of the first mirror 30 and the reflecting surface of the second mirror 40 face each other substantially in a parallel fashion. Of the two mirrors 30 and 40, at least the first mirror 30 has the property of transmitting a portion of light propagating through the optical waveguide layer 30. In other words, the first mirror 30 has a higher light transmittance against the light than the second mirror 40. For this reason, a portion of light propagating through the optical waveguide layer 20 is emitted outward from the first mirror 30. Such mirrors 30 and 40 may for example be multilayer mirrors that are formed by multilayer films of dielectrics (sometimes referred to as "multilayer reflective films" or "distributed Bragg reflector (DBR)").

An optical two-dimensional scan can be achieved by controlling the phases of lights that are inputted to the respective waveguide elements 10 and, furthermore, causing the refractive indices or thicknesses of the optical waveguide layers 20 of these waveguide elements 10 or the wavelengths of lights that are inputted to the optical waveguide layers 20 to simultaneously change in synchronization.

In order to achieve such a two-dimensional scan, the inventor conducted an analysis on the principle of operation of a waveguide element 10. As a result of their analysis, the inventor succeeded in achieving an optical two-dimensional scan by driving a plurality of waveguide elements 10 in synchronization.

As shown in FIG. 1, inputting light to each waveguide element 10 causes light to exit the waveguide element 10 through an exit surface of the waveguide element 10. The exit face is located on the side opposite to the reflecting surface of the first mirror 30. The direction D3 of the emitted light depends on the refractive index and thickness of the optical waveguide layer and the wavelength of light. In the present disclosure, at least one of the refractive index of each optical waveguide layer, the thickness of each optical waveguide layer, or the wavelength is controlled in synchronization so that lights that are emitted separately from each waveguide element 10 are oriented in substantially the same direction. This makes it possible to change X-direction components of the wave number vectors of lights that are emitted from the plurality of waveguide elements 10. In other words, this makes it possible to change the direction D3 of the emitted light along a direction 101 shown in FIG. 1.

Furthermore, since the lights that are emitted from the plurality of waveguide elements 10 are oriented in the same direction, the emitted lights interfere with one another. By controlling the phases of the lights that are emitted from the respective waveguide elements 10, a direction in which the lights reinforce one another by interference can be changed. For example, in a case where a plurality of waveguide elements 10 of the same size are placed at equal spacings in the Y direction, lights differing in phase by a constant amount from one another are inputted to the plurality of waveguide elements 10. By changing the phase differences, Y-direction components of the wave number vectors of the emitted lights can be changed. In other words, by varying phase differences among lights that are introduced into the plurality of waveguide elements 10, the direction D3, in which the emitted lights reinforce one another by interference, can be changed along a direction 102 shown in FIG. 1. This makes it possible to achieve an optical two-dimensional scan.

The following describes the principle of operation of the optical scan device 100.

Principle of Operation of Waveguide Element

Figure 2:
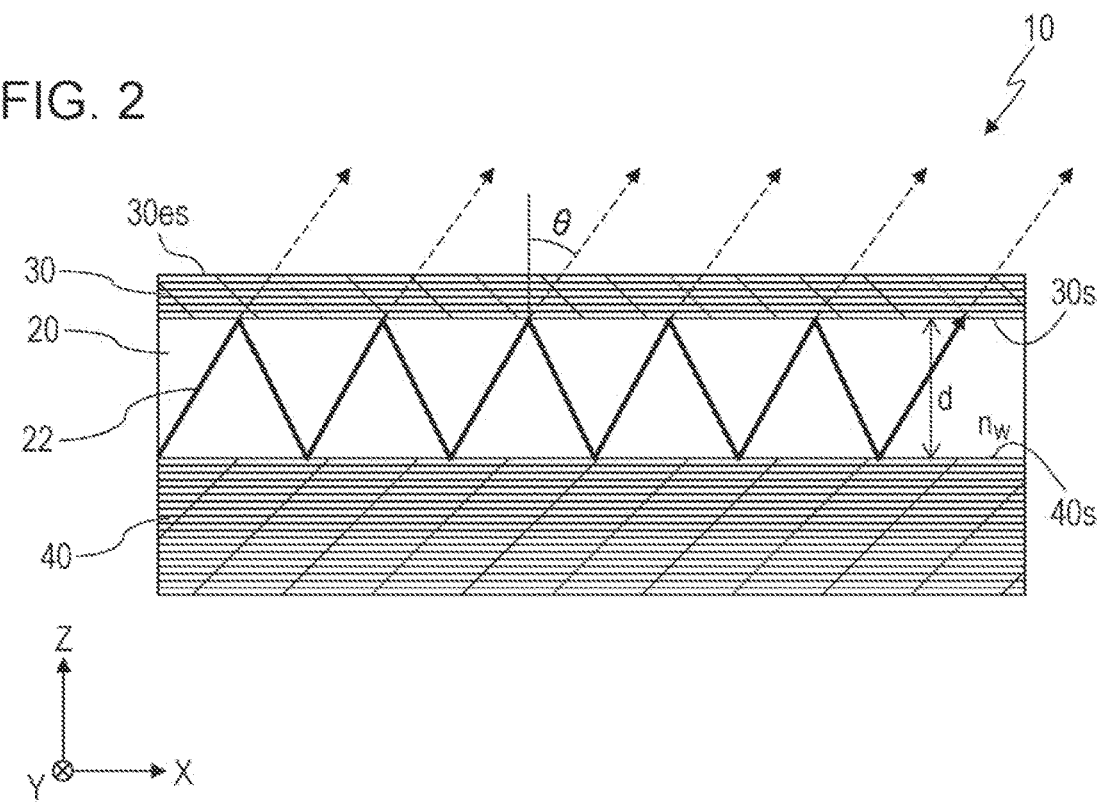
FIG. 2 is a diagram schematically showing an example of a cross-section structure of one waveguide element and an example of propagating light.

FIG. 2 is a diagram schematically showing an example of a cross-section structure of one waveguide element 10 and an example of propagating light. With a Z direction being a direction perpendicular of the X and Y directions shown in FIG. 1, FIG. 2 schematically shows a cross-section parallel to an X-Z plane of the waveguide element 10. The waveguide element 10 is configured such that the pair of mirrors 30 and 40 are disposed so as to hold the optical waveguide layer 20 therebetween. Light 22 introduced into the optical waveguide layer 20 through one end of the optical waveguide layer 20 in the X direction propagates through the inside of the optical waveguide layer 20 while being repeatedly reflected by a first reflecting surface 30s of the first mirror 30 provided on an upper surface (in FIG. 2, the upper side) of the optical waveguide layer 20 and a second reflecting surface 40s of the second mirror 40 provided on a lower surface (in FIG. 2, the lower side) of the optical waveguide layer 20. The light transmittance of the first mirror 30 is higher than the light transmittance of the second mirror 40. For this reason, a portion of the light can be outputted mainly from the exit surface 30es of the first mirror 30. In the following, the first reflecting surface 30s is simply referred to as "reflecting surface 30s", and the "second reflecting surface 40s" simply as "reflecting surface 40s".

In the case of a waveguide such as an ordinary optical fiber, light propagates along the waveguide while repeating total reflection. On the other hand, in the case of a waveguide element 10, light propagates while being repeatedly reflected by the mirrors 30 and 40 disposed above and below, respectively, the optical waveguide layer 20. For this reason, there are no restrictions on angles of propagation of light. The term "angle of propagation of light" here means an angle of incidence on the interface between the mirror 30 or 40 and the optical waveguide layer 20. Light falling on the mirror 30 or 40 at an angle that is closer to the perpendicular can be propagated, too. That is, light falling on the interface at an angle that is smaller than a critical angle of total reflection can be propagated, too. This causes the group speed of light in the direction of propagation of light to be much lower than the speed of light in free space. For this reason, the waveguide element 10 has such a property that conditions for propagation of light vary greatly according to changes in the wavelength of light, the thickness of the optical waveguide layer 20, and the refractive index of the optical waveguide layer 20. The waveguide element 10 is referred to as "reflective waveguide" or "slow light waveguide".

The angle of emission θ of light that is emitted into the air from the waveguide element 10 is expressed by Formula (1) as follows:

$$\sin\theta = \sqrt{n_w^2 - \left(\frac{m\lambda}{2d}\right)^2} \quad (1)$$

As can be seen from Formula (1), the direction of emission of light can be changed by changing any of the wavelength λ of light in the air, the refractive index $n_w$ of the optical waveguide layer 20, and the thickness d of the optical waveguide layer 20.

For example, in a case where $n_w$=2, d=387 nm, λ=1550 nm, and m=1, the angle of emission is 0 degree. Changing the refractive index from this state to $n_w$=2.2 changes the angle of emission to approximately 66 degrees. Meanwhile, changing the thickness to d=420 nm without changing the refractive index changes the angle of emission to approximately 51 degrees. Changing the wavelength to λ=1500 nm without changing the refractive index or the thickness changes the angle of emission to approximately 30 degrees. In this way, the direction of emission of light can be greatly changed by changing any of the wavelength λ of light, the refractive index $n_w$ of the optical waveguide layer 20, and the thickness d of the optical waveguide layer 20.

Accordingly, the optical scan device 100 of the present disclosure controls the direction of emission of light by controlling at least one of the wavelength λ of light that is inputted to each of the optical waveguide layers 20, the refractive index $n_w$ of each of the optical waveguide layers 20, or the thickness d of each of the optical waveguide layers 20. The wavelength λ of light may be kept constant without being changed during operation. In that case, an optical scan can be achieved through a simpler configuration. The wavelength λ is not limited to a particular wavelength. For example, the wavelength λ may be included in a wavelength range of 400 nm to 1100 nm (from visible light to near-infrared light) within which high detection sensitivity is attained by a common photodetector or image sensor that detects light by absorbing light through silicon (Si). In another example, the wavelength λ may be included in a near-infrared wavelength range of 1260 nm to 1625 nm within which an optical fiber or a Si waveguide has a comparatively small transmission loss. It should be noted that these wavelength ranges are merely examples. A wavelength range of light that is used is not limited to a wavelength range of visible light or infrared light but may for example be a wavelength range of ultraviolet light.

In order to change the direction of emitted light, the optical scan device 100 may include a first adjusting element that changes at least one of the refractive index of the optical waveguide layer 20 of each waveguide element 10, the thickness of the optical waveguide layer 20 of each waveguide element 10, or the wavelength.

As stated above, using a waveguide element 10 makes it possible to greatly change the direction of emission of light by changing at least one of the refractive index $n_w$ of the optical waveguide layer 20, the thickness d of the optical waveguide layer 20, or the wavelength λ. This makes it possible to change, to a direction along the waveguide element 10, the angle of emission of light that is emitted from the mirror 30. By using at least one waveguide element 10, such a one-dimensional scan can be achieved.

In order to adjust the refractive index of at least a part of the optical waveguide layer 20, the optical waveguide layer 20 may contain a liquid crystal material or an electro-optical material. The optical waveguide layer 20 may be sandwiched between a pair of electrodes. By applying a voltage to the pair of electrodes, the refractive index of the optical waveguide layer 20 can be changed.

In order to adjust the thickness of the optical waveguide layer 20, at least one actuator may be connected, for example, to at least either the first mirror 30 or the second mirror 40. The thickness of the optical waveguide layer 20 can be changed by varying the distance between the first mirror 30 and the second mirror 40 through the at least one actuator. When the optical waveguide layer 20 is formed from liquid, the thickness of the optical waveguide layer 20 may easily change.

Principle of Operation of Two-Dimensional Scan

In a waveguide array in which a plurality of waveguide elements 10 are unidirectionally arrayed, the interference of lights that are emitted from the respective waveguide elements 10 brings about a change in direction of emission of light. By adjusting the phases of lights that are supplied separately to each waveguide element 10, the direction of emission of light can be changed. The following describes the principles on which it is based.

Figure 3A:
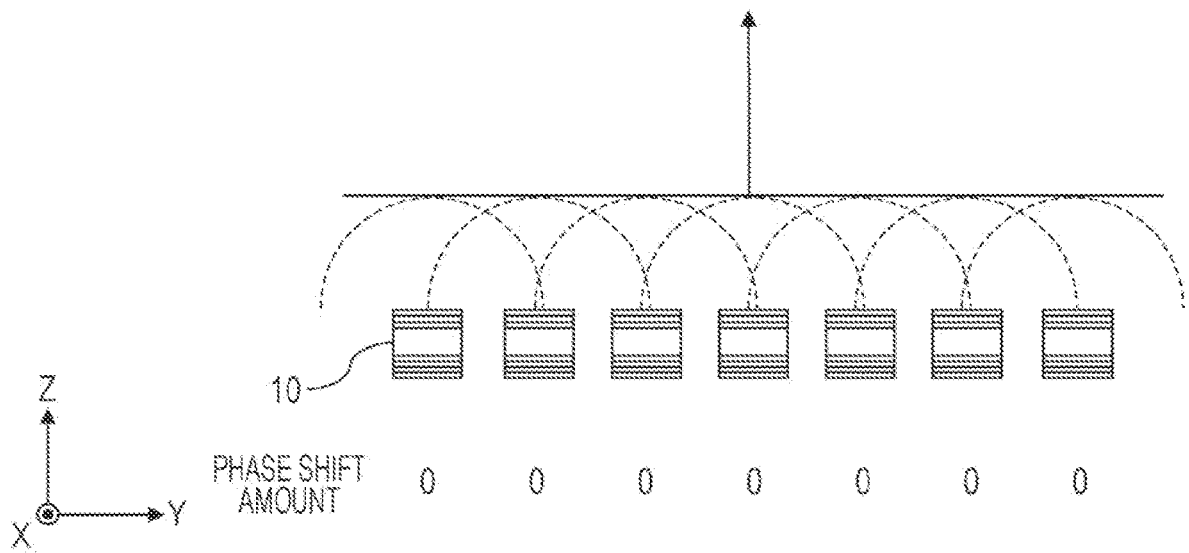
FIG. 3A is a diagram showing a cross-section of a waveguide array that emits light in a direction perpendicular to an exit face of the waveguide array.

FIG. 3A is a diagram showing a cross-section of a waveguide array that emits light in a direction perpendicular to an exit face of the waveguide array. FIG. 3A also describes the phase shift amounts of lights that propagate separately through each waveguide element 10. Note here that the phase shift amounts are values based on the phase of the light that propagates through the leftmost waveguide element 10. The waveguide array of the present disclosure includes a plurality of waveguide elements 10 arrayed at equal spacings. In FIG. 3A, the dashed circular arcs indicate the wave fronts of lights that are emitted separately from each waveguide element 10. The straight line indicates a wave front that is formed by the interference of the lights. The arrow indicates the direction of light that is emitted from the waveguide array (i.e. the direction of a wave number vector). In the example shown in FIG. 3A, lights propagating through the optical waveguide layers 20 of each separate waveguide element 10 are identical in phase to one another. In this case, the light is emitted in a direction (Z direction) perpendicular to both an array direction (Y direction) of the waveguide elements 10 and a direction (X direction) in which the optical waveguide layers 20 extend.

Figure 3B:
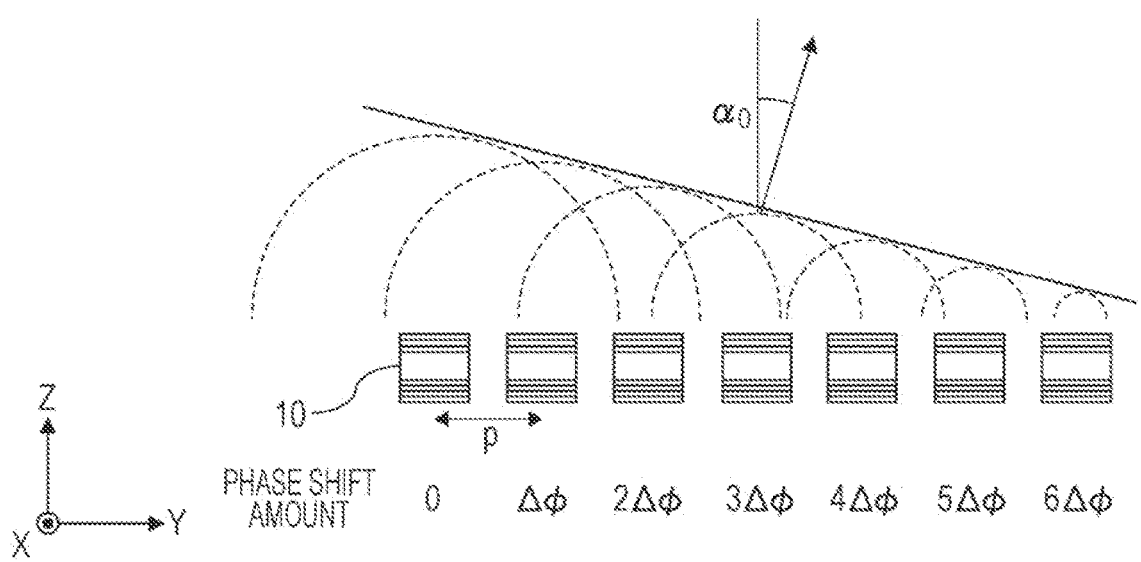
FIG. 3B is a diagram showing a cross-section of a waveguide array that emits light in a direction different from a direction perpendicular to an exit face of the waveguide array.

FIG. 3B is a diagram showing a cross-section of a waveguide array that emits light in a direction different from a direction perpendicular to an exit face of the waveguide array. In the example shown in FIG. 3B, lights propagating through the optical waveguide layers 20 of the plurality of waveguide elements 10 differ in phase from one another by a constant amount ($\Delta\varphi$) in the array direction. In this case, the light is emitted in a direction different from the Z direction. By varying $\Delta\varphi$, a Y-direction component of the wave number vector of the light can be changed. Assuming that p is the center-to-center distance between two adjacent waveguide elements 10, the angle of emission $\alpha_0$ of light is expressed by Formula (2) as follows:

$$\sin\alpha_0 = \frac{\Delta\phi\lambda}{2\pi p} \quad (2)$$

In the example shown in FIG. 2, the direction of emission of light is parallel to the X-Z plane. That is, $\alpha_0=0°$. In each of the examples shown in FIGS. 3A and 3B, the direction of light that is emitted from the optical scan device 100 is parallel to a Y-Z plane. That is, $\theta=0°$. However, in general, the direction of light that is emitted from the optical scan device 100 is not parallel to the X-Z plane or the Y-Z plane. That is, $\theta\neq0°$ and $\alpha_0\neq0°$.

Figure 4:
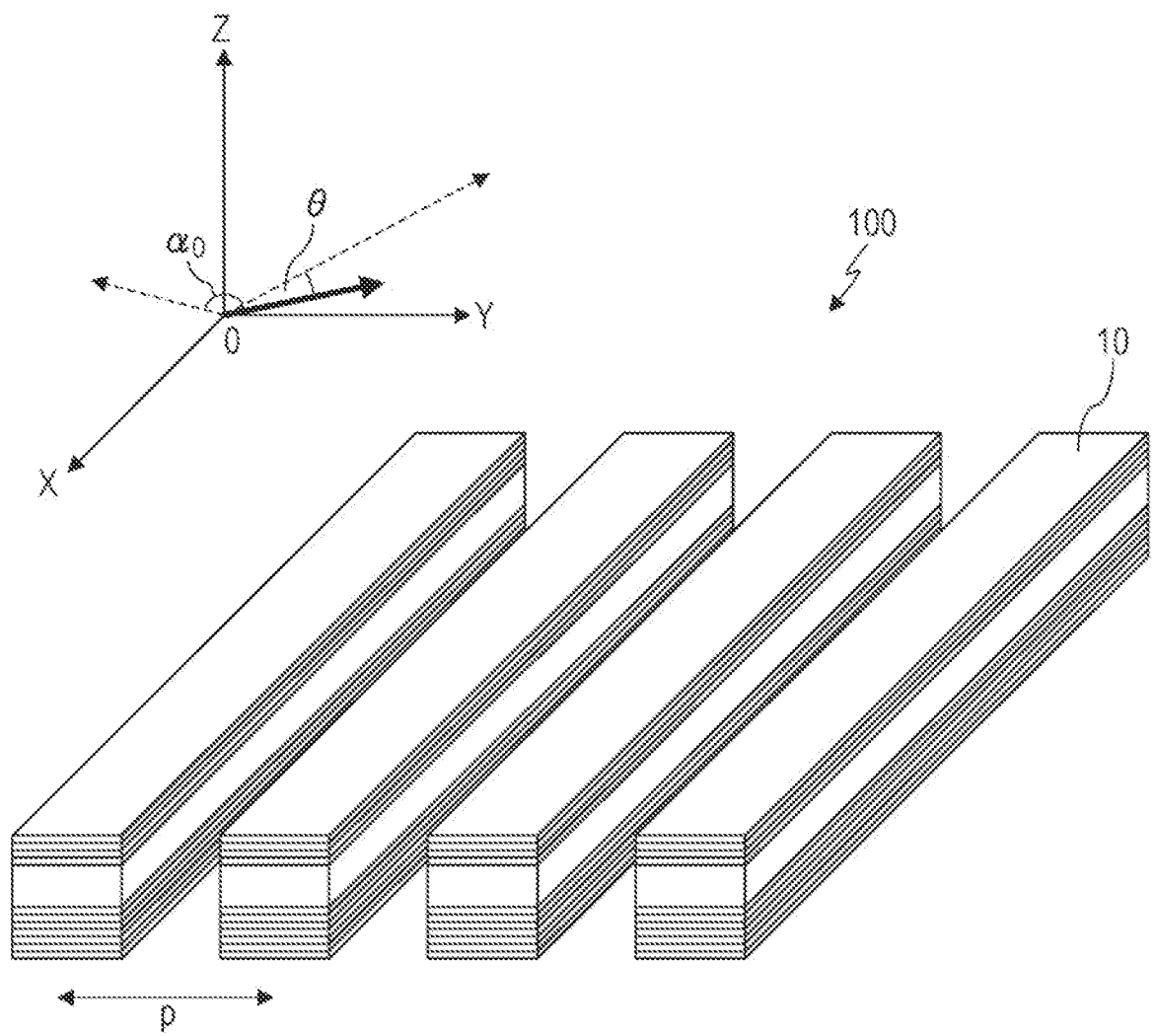
FIG. 4 is a perspective view schematically showing an example of a waveguide array in a three-dimensional space.

FIG. 4 is a perspective view schematically showing an example of a waveguide array in a three-dimensional space. The bold arrow shown in FIG. 4 represents the direction of light that is emitted from the optical scan device 100. $\theta$ is the angle formed by the direction of emission of light and the Y-Z plane. $\theta$ satisfies Formula (1). $\alpha_0$ is the angle formed by the direction of emission of light and the X-Z plane. $\alpha_0$ satisfies Formula (2).

Phase Control of Light that is Introduced into Waveguide Array

In order to control the phases of lights that are emitted from the respective waveguide elements 10, a phase shifter that changes the phase of light may be provided, for example, at a stage prior to the introduction of light into a waveguide element 10. The optical scan device 100 of the present disclosure includes a plurality of phase shifters connected separately to each of the plurality of waveguide elements 10 and a second adjusting element that adjusts the phases of lights that propagate separately through each phase shifter. Each phase shifter includes a waveguide joined either directly or via another waveguide to the optical waveguide layer 20 of a corresponding one of the plurality of waveguide elements 10. The second adjusting element varies differences in phase among lights propagating from the plurality of phase shifters to the plurality of waveguide elements 10 and thereby changes the direction (i.e. the third direction D3) of light that is emitted from the plurality of I waveguide elements 10. As is the case with the waveguide array, a plurality of arrayed phase shifters are hereinafter sometimes referred to as "phase shifter array".

Figure 5:
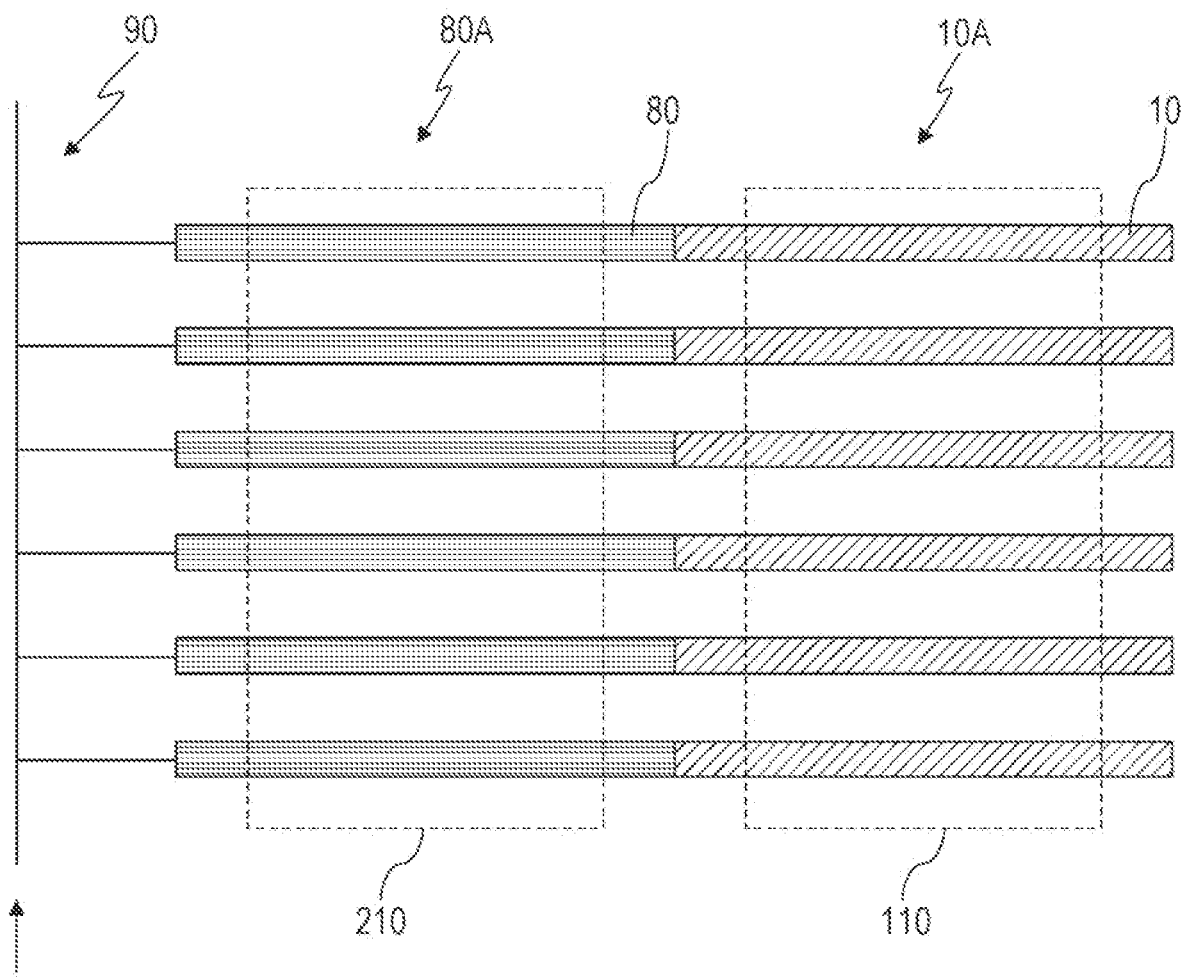
FIG. 5 is a schematic view of a waveguide array and a phase shifter array as seen from an angle parallel with a direction (Z direction) normal to a light exit face.

FIG. 5 is a schematic view of a waveguide array 10A and a phase shifter array 80A as seen from an angle parallel with a direction (Z direction) normal to a light exit face. In the example shown in FIG. 5, all phase shifters 80 have the same propagation characteristics, and all waveguide elements 10 have the same propagation characteristics. The phase shifter 80 and the waveguide elements 10 may be the same in length or may be different in length. In a case where the phase shifters 80 are equal in length, the respective phase shift amounts can be adjusted, for example, by a driving voltage. Further, by making a structure in which the lengths of the phase shifters 80 vary in equal steps, phase shifts can be given in equal steps by the same driving voltage. Furthermore, this optical scan device 100 further includes an optical divider 90 that divides light into lights and supplies the lights to the plurality of phase shifters 80, a first driving circuit 110 that drives each waveguide element 10, and a second driving circuit 210 that drives each phase shifter 80. The straight arrow shown in FIG. 5 indicates the inputting of light. A two-dimensional scan can be achieved by independently controlling the first driving circuit 110 and the second driving circuit 210, which are separately provided. In this example, the first driving circuit 110 functions as one element of the first adjusting element, and the second driving circuit 210 functions as one element of the second adjusting element.

The first driving circuit 110 changes at least either the refractive index or thickness of the optical waveguide layer 20 of each waveguide element 10 and thereby changes the angle of light that is emitted from the optical waveguide layer 20. The second driving circuit 210 changes the refractive index of the waveguide 20a of each phase shifter 80 and thereby changes the phase of light that propagates through the inside of the waveguide 20a. The optical divider 90 may be constituted by a waveguide through which light propagates by total reflection or may be constituted by a reflective waveguide that is similar to a waveguide element 10.

The lights divided by the optical divider 90 may be introduced into the phase shifters 80 after the phases of the lights have been controlled, respectively. This phase control may involve the use of, for example, a passive phase control structure based on an adjustment of the lengths of waveguides leading to the phase shifters 80. Alternatively, it is possible to use phase shifters that are similar in function to the phase shifters 80 and that can be controlled by electrical signals. The phases may be adjusted by such a method prior to introduction into the phase shifters 80, for example, so that lights of equal phases are supplied to all phase shifters 80. Such an adjustment makes it possible to simplify the control of each phase shifter 80 by the second driving circuit 210.

An optical device that is similar in configuration to the aforementioned optical scan device 100 can also be utilized as an optical receiver device. Details of the principle of operation of the optical device, a method of operation of the optical device, and the like are disclosed in U.S. Patent Application Publication No. 2018/0224709, the disclosure of which is hereby incorporated by reference herein in its entirety.

Angle of Emission and Beam Line Width of Emitted Light

The beam line width of light that is emitted from a slow light waveguide 10 determines the resolving power of a scan. A narrower beam line width leads to brings about improvement in resolving power of a scan, and a greater beam line width brings about a decrease in resolving power of a scan. The following describes a relationship between the beam line width and the angle of emission of light that is emitted from a conventional slow light waveguide 10.

A distant pattern of light that is emitted from the slow light waveguide 10 is equivalent to the Fourier transform of the distribution of electric fields over the exit surface 30es shown in FIG. 2. That is, an increase in length of propagation of light propagating through the optical waveguide layer 20 leads to a decrease in beam line width of the emitted light at a great distance. On the other hand, a decrease in length of propagation of light propagating through the optical waveguide layer 20 leads to an increase in beam line width of the emitted light at a great distance. The term "length of propagation" here means the distance that the intensity of light 22 that propagates through the optical waveguide layer 20 while attenuating decreases to 1/e. e is the base of a natural logarithm. The term "beam line width" means the angle $\Delta\theta$ of spread to both sides with the angle of emission $\theta$ in the center. Specifically, the beam line width is described as a full width at half maximum of the emitted light in an angle spectrum.

Figure 6A:
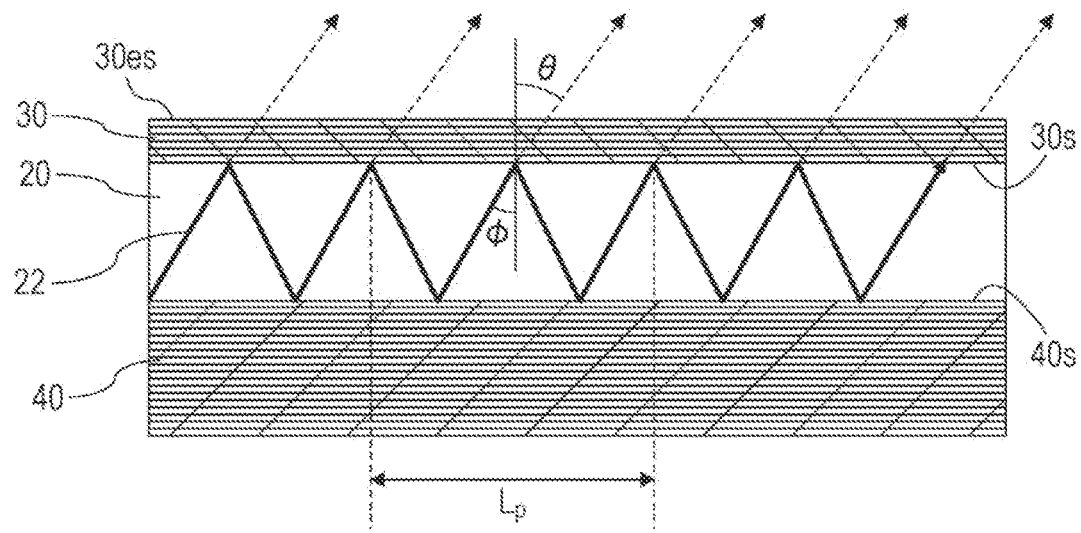
FIG. 6A is a diagram schematically showing how light is emitted from the exit surface in a case where an angle of propagation is small.
Figure 6B:
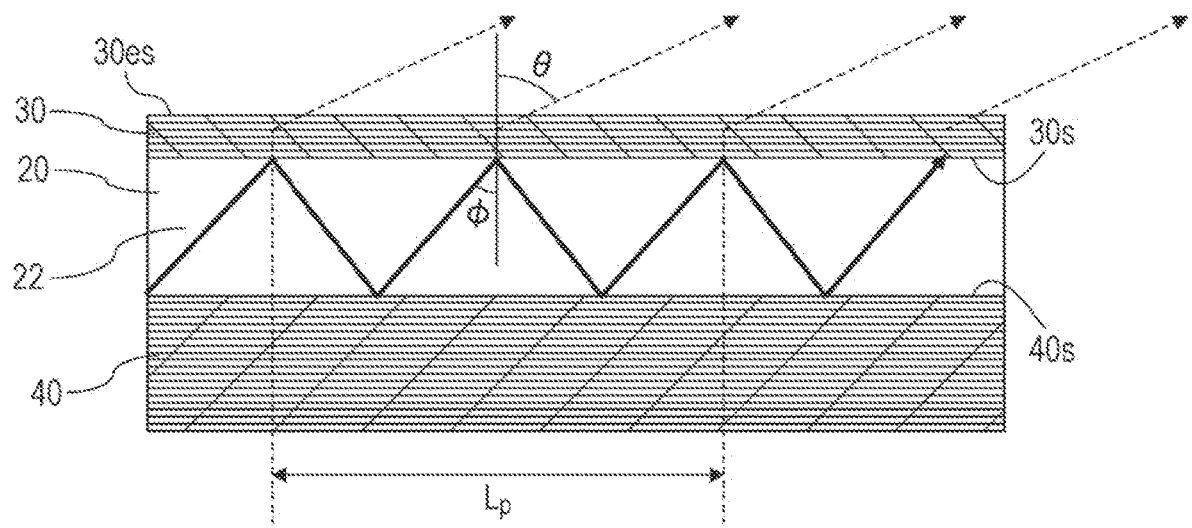
FIG. 6B is a diagram schematically showing how light is emitted from the exit surface in a case where the angle of propagation is large.

FIGS. 6A and 6B are diagrams schematically showing how light is emitted from the exit surface 30es in cases where an angle of propagation $\varphi$ is relatively small and relatively large, respectively. For simplicity, assume that the reflectance of the mirror 30 is constant regardless of the angle of propagation cp. In the example shown in FIG. 6A, in which the angle of propagation $\varphi$ is small, the number of times the reflecting surface 30s reflects the light 22 per unit length is large. Accordingly, a length of propagation $L_p$ is short. In the example shown in FIG. 6B, in which the angle of propagation $\varphi$ is large, the number of times the reflecting surface 30s reflects the light 22 per unit length is small. Accordingly, the length of propagation $L_p$ is long. Since there is a positive correlation between the angle of propagation $\varphi$ and the angle of emission $\theta$, an increase in the angle of emission $\theta$ leads to an increase in the length of propagation $L_p$. It should be noted that the length of propagation $L_p$ indicated by a double-headed arrow in each of FIGS. 6A and 6B is a schematic representation and does not represent an actual length.

Figure 7:
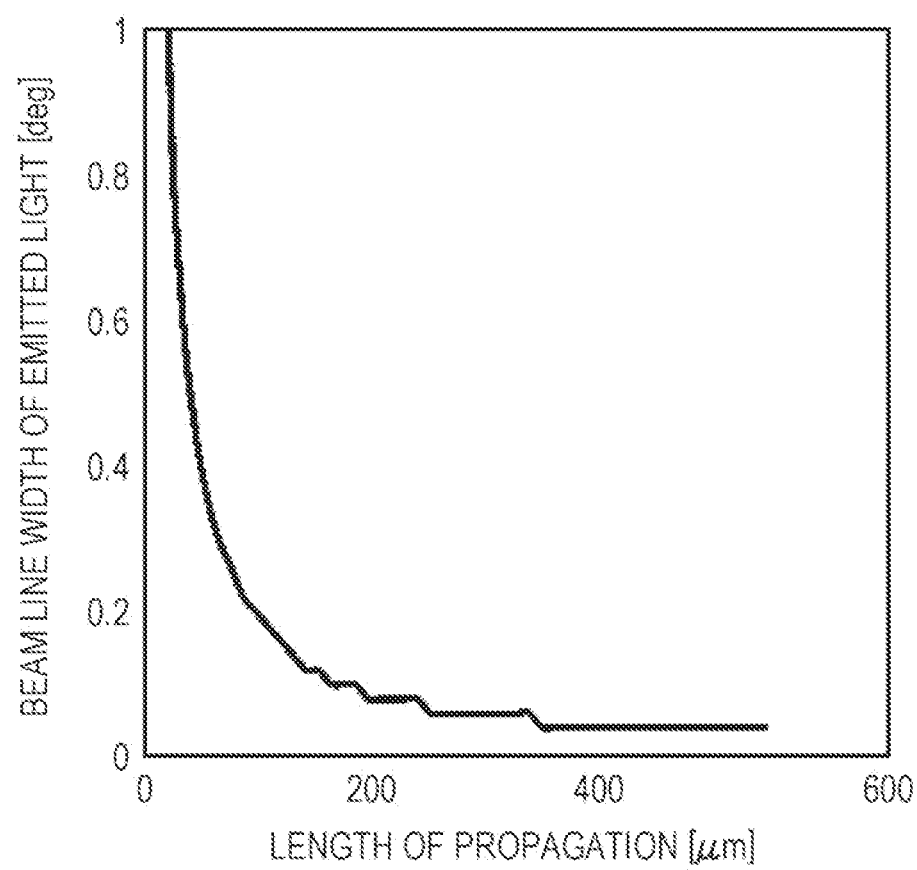
FIG. 7 is a diagram showing a result of calculation of a relationship between length of propagation and the beam line width of emitted light.

FIG. 7 is a diagram showing an example of a relationship between the length of propagation $L_p$ and the beam line width $\Delta\theta$ of emitted light. The graph shown in FIG. 7 shows a result obtained by calculating, with varying lengths of propagation, the line width of a light beam that is emitted from one slow light waveguide 10 in which conditions such as the dimensions and dielectric constant of each constituent element are set as appropriate. As shown in FIG. 7, an increase in the length of propagation $L_p$ leads to a decrease in the beam line width $\Delta\theta$ of the emitted light. Since an increase in the angle of emission $\theta$ leads to an increase in the length of propagation $L_p$ as mentioned above, an increase in the angle of emission $\theta$ leads to a decrease in the beam line width $\Delta\theta$ of the emitted light. Thus, since the beam line width $\Delta\theta$ of the emitted light depends on the angle of emission $\theta$, a change in the angle of emission $\theta$ causes a change in resolving power of a scan.

The inventors found the foregoing problem and studied to configure an optical device to solve this problem. As a result, the inventors found that the foregoing problem can be solved by using, as one of two mirrors of a slow light waveguide, a non-conventional mirror having a special property. An embodiment of the present disclosure described below is based on these findings. The following describes an exemplary embodiment of the present disclosure.

For comparison, the reflection spectrum of a conventional DBR(s) that may be used as the mirror 30 and/or the mirror 40 in a slow light waveguide 10 is/are described here.

As shown in FIG. 2, the light 22 propagates through the optical waveguide layer 20 while being reflected by the reflecting surface 30s of the mirror 30 and the reflecting surface 40s of the mirror 40. At this point in time, the reflectances of the mirrors 30 and 40 are approximately 99% even on the side from which light is emitted. In order to achieve such high reflectances, the mirror 30 and the mirror 40 may be formed from DBRs. The following describes an example of a reflection spectrum obtained in a case where light falls on a reflecting surface of a conventional DBR. The angle of incidence at which light falls on the reflecting surface is equivalent to the angle of propagation cp.

Figure 8:
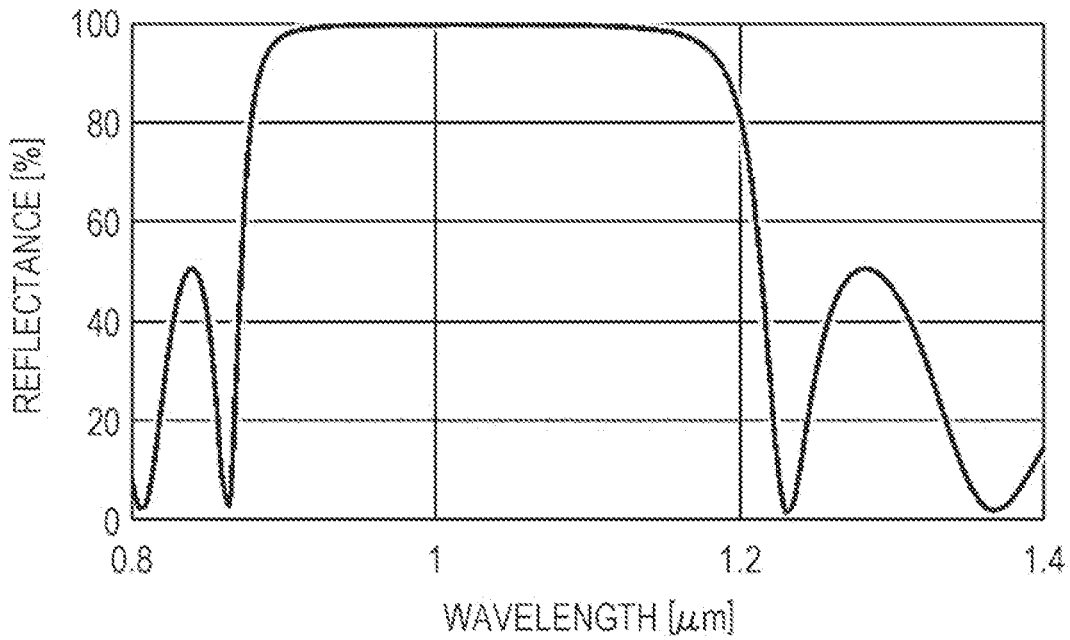
FIG. 8 is a diagram showing the reflection spectrum of a conventional DBR at an angle of incidence of 0 degree.

FIG. 8 is a diagram showing the reflection spectrum of the conventional DBR at an angle of incidence $\varphi$ of 0 degree. An angle of incidence $\varphi$ of 0 degree is equivalent to the angle at which light arrives from a direction normal to the reflecting surface of the DBR. The reflection spectrum was calculated by using a Synopsys' DiffractMOD. The refractive index of a medium on an entrance side of the DBR in this example is 1.68. The DBR is equivalent to the mirror 30 of the slow light waveguide 10, and the medium on the entrance side is equivalent to the optical waveguide layer 20 of the slow light waveguide 10. This DBR has a structure in which nine high-refractive-index layers and eight low-refractive-index layers are alternately stacked. Each high-refractive-index layer has a refractive index of 2.28 and a thickness of 111 nm. Each low-refractive-index layer has a refractive index of 1.47 and a thickness of 173 nm. As shown in FIG. 8, the reflection spectrum of the conventional DBR exhibits a design reflectance of approximately 100% in a stopband and exhibits a low reflectance away from the stopband. The term "stopband" here means a wavelength region in which incident light is strongly reflected by a Bragg reflection attributed to a periodic structure.

Figure 9:
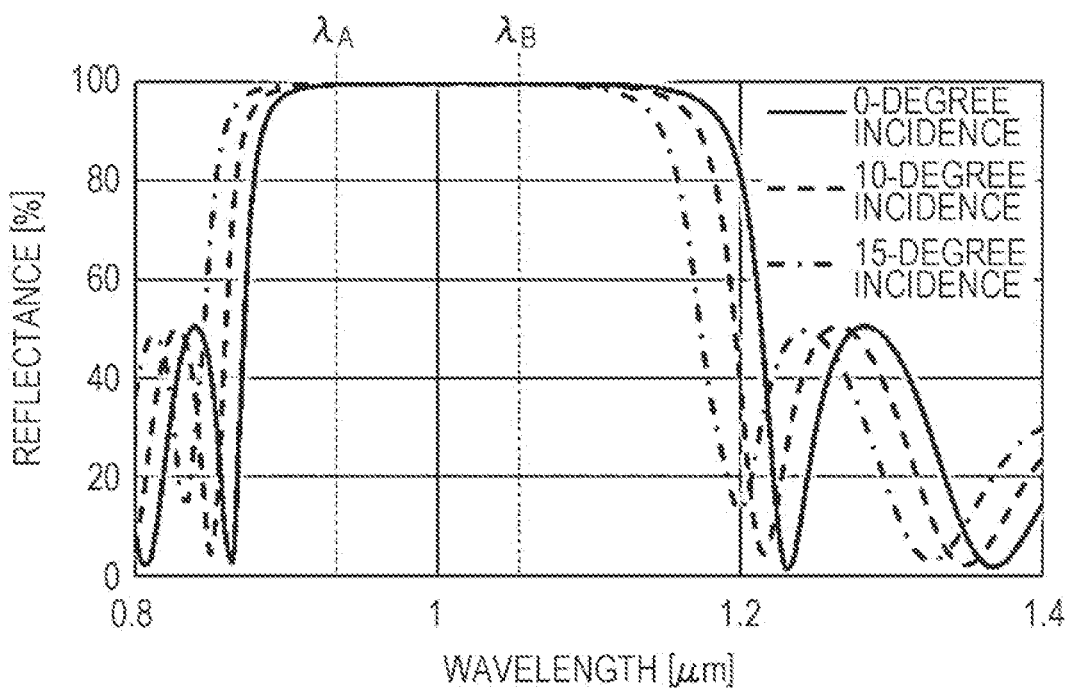
FIG. 9 is a diagram showing the reflection spectrum of the conventional DBR at angles of incidence of 0 degree, 10 degrees, and 15 degrees.

FIG. 9 is a diagram showing the reflection spectrum of the conventional DBR at angles of incidence $\varphi$ of 0 degree, 10 degrees, and 15 degrees. As shown in FIG. 9, the reflection spectrum shifts toward a short-wavelength side as the angle of incidence $\varphi$ increases. The following describes as an example how the reflectance of light at a wavelength $\lambda_A$ of 940 nm and the reflectance of light at a wavelength $\lambda_B$ of 1100 nm vary according to the angle of incidence cp.

Figure 10A:
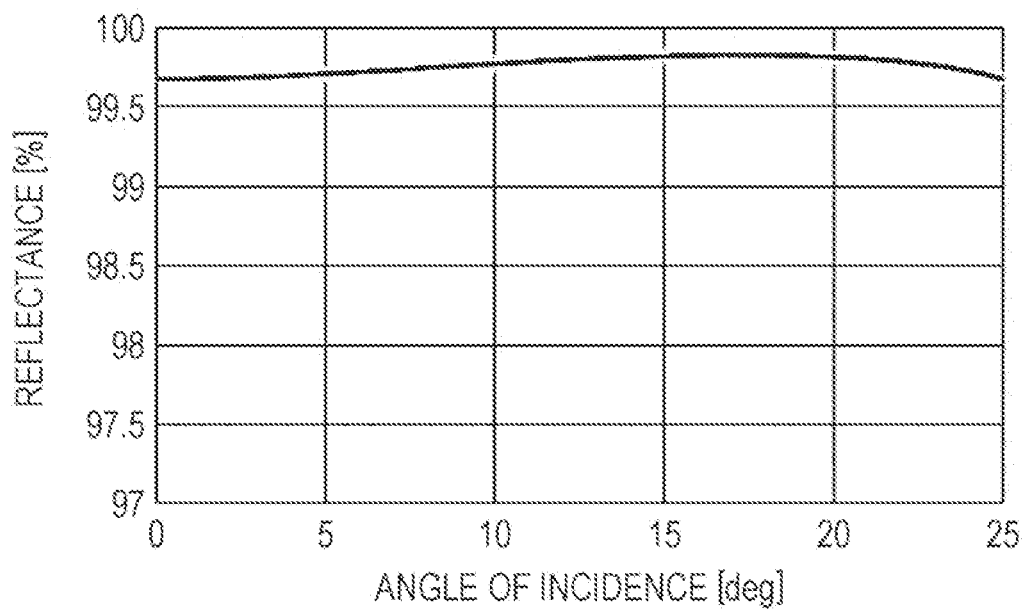
FIG. 10A is a diagram showing an example of a relationship between angle of incidence and reflectance at a wavelength of 940 nm.
Figure 10B:
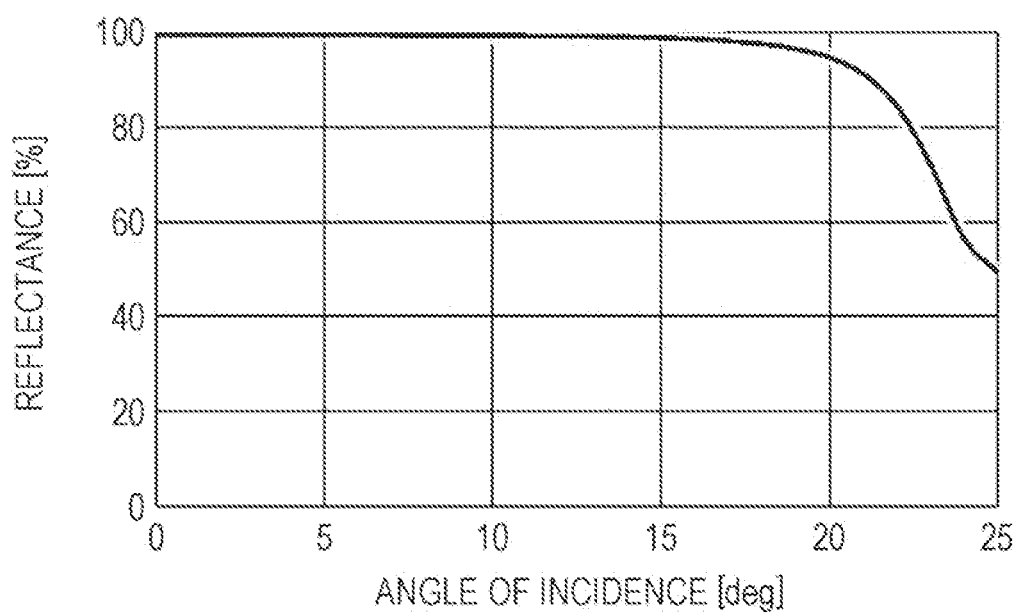
FIG. 10B is a diagram showing an example of a relationship between angle of incidence and reflectance at a wavelength of 1100 nm.

FIGS. 10A and 10B are diagrams showing a relationship between the angle of incidence $\varphi$ and the reflectance of light at a wavelength $\lambda_A$ of 940 nm and a relationship between the angle of incidence $\varphi$ and the reflectance of light at a wavelength $\lambda_B$ of 1100 nm, respectively. The range within which the angle of incidence $\varphi$ is greater than or equal to 0 degree and less than or equal to 25 degrees is equivalent to the range within which the angle of emission $\theta$ is greater than or equal to 0 degree and less than or equal to 60 degrees. As shown in FIG. 10A, the reflectance of light at the wavelength $\lambda_A$ is low in wavelength dependency. Accordingly, for the aforementioned reason, the beam line width $\Delta\theta$ of the emitted light becomes narrower as the angle of emission $\theta$ increases. Meanwhile, as shown in FIG. 10B, at the wavelength $\lambda_B$, which is close to an end of the stopband, the reflectance too sharply drops near an angle of incidence φ of 15 degrees. For this reason, when the angle of incidence φ falls within a range of 0 degree to approximately 15 degrees, the beam line width Δθ of the emitted light becomes narrower as the angle of emission θ increases, and when the angle of incidence φ falls within a range of approximately 15 degrees to 25 degrees, the beam line width Δθ of the emitted light increases as the angle of emission θ increases. In each of the examples shown in FIGS. 10A and 10B, the beam line width Δθ of the emitted light varies greatly according to the angle of emission θ.

The inventors found from the above that an optical scan device in which the beam line width Δθ of emitted light does not vary greatly according to the angle of emission θ can be achieved by using a mirror whose reflectance slowly decreases as the angle of incidence φ increases. Specifically, by providing points of inflection from a local maximum value to a long-wavelength side in the reflection spectrum of a mirror, the inventors achieved a mirror whose reflectance slowly decreases as the angle of incidence φ increases. In the present embodiment, a chirp DBR in which the thicknesses of high-refractive-index and low-refractive-index layers are adjusted as appropriate was used as a mirror having points of inflection in the reflection spectrum. The term "chirp DBR" herein means a DBR in which the thicknesses of a plurality of high-refractive-index layers and/or the thicknesses of a plurality of low-refractive-index layers vary from layer to layer. The chirp DBR encompasses not only a DBR in which the thicknesses of a plurality of high-refractive-index layers and/or the thicknesses of a plurality of low-refractive-index layers gradually increase or decrease along a direction of stacking but also a DBR in which the thicknesses of a plurality of high-refractive-index layers and/or the thicknesses of a plurality of low-refractive-index layers irregularly or randomly vary along a direction of stacking.

Figure 11:
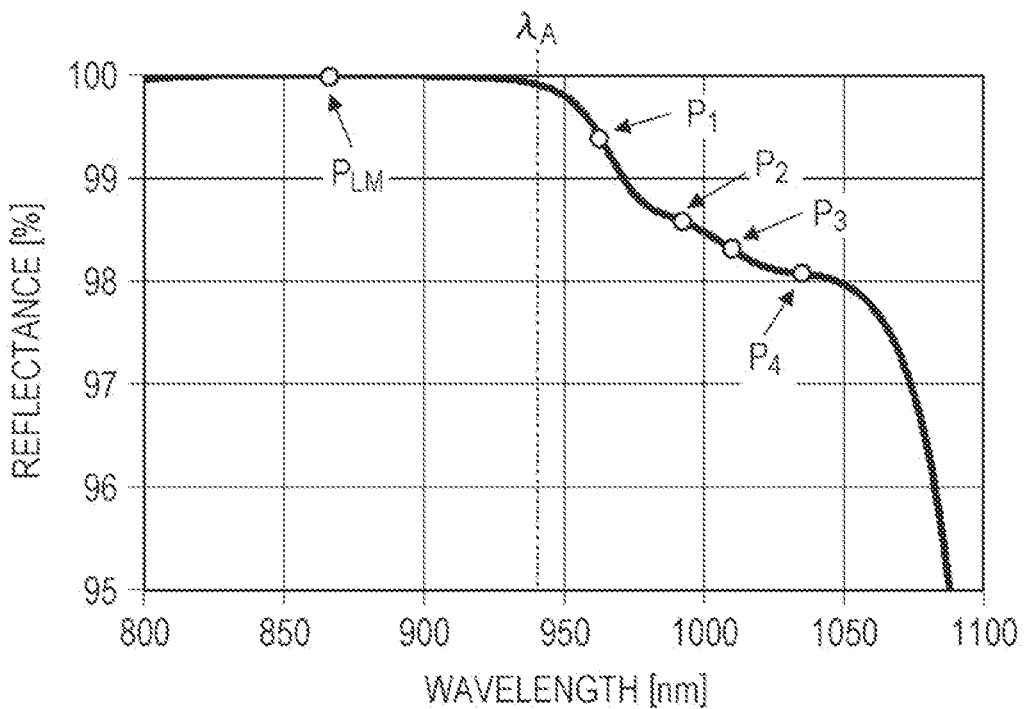
FIG. 11 is a diagram showing the reflection spectrum of a chirp DBR of the present embodiment at an angle of incidence of 0 degree.

FIG. 11 is a diagram showing the reflection spectrum of a chirp DBR of the present embodiment at an angle of incidence φ of 0 degree. In the example shown in FIG. 11, the reflection spectrum includes, in a wavelength region in which the reflectance is higher than or equal to 95%, one local maximum point $P_{LM}$ and points of inflection $P_1$ to $P_4$ located on a long-wavelength side of the local maximum point $P_{LM}$. In the reflection spectrum, the reflectance monotonically decreases on the long-wavelength side of the local maximum point $P_{LM}$. The term "point of inflection" here means a point at which the quadratic differential of the reflectance in relation to the wavelength reaches zero. At the points of inflection, the reflectance linearly varies with respect to the wavelength.

In the reflection spectrum of the chirp DBR of the present embodiment, the local maximum point $P_{LM}$ and the points of inflection $P_1$ to $P_4$ are present in a wavelength region that exhibits a reflectance higher than or equal to 95%. The chirp DBR may be designed such that the local maximum point $P_{LM}$ and the points of inflection $P_1$ to $P_4$ are present in a wavelength region in which the reflectance is higher than or equal to 90%.

Figure 18:
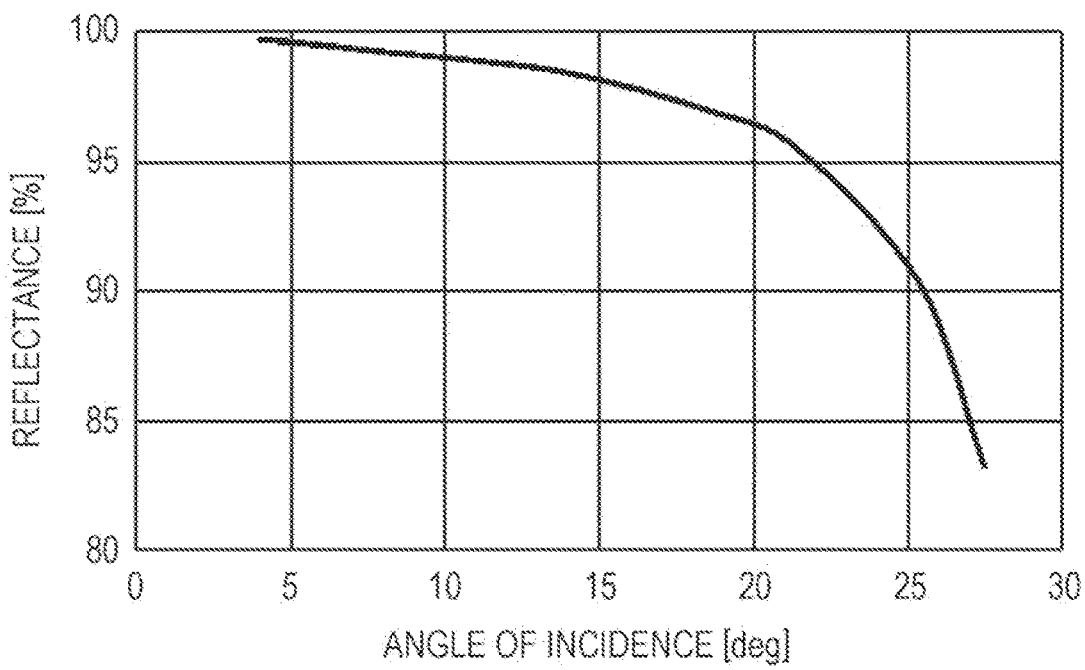
FIG. 18 is a diagram showing an example of a relationship between the angle of incidence φ and reflectance at a length of propagation of 100 μm.

FIG. 7 shows that a length of propagation greater than or equal to approximately 100 μm is required for the beam line width Δθ to be less than or equal to approximately 0.2°. FIG. 18 is a diagram showing a relationship between the angle of incidence φ and reflectance at a length of propagation of 100 μm. As indicated by FIG. 18, the reflectance needs to be higher than or equal to approximately 90% in order for the length of propagation to be kept until an angle of incidence of 25 degrees.

Figure 12:
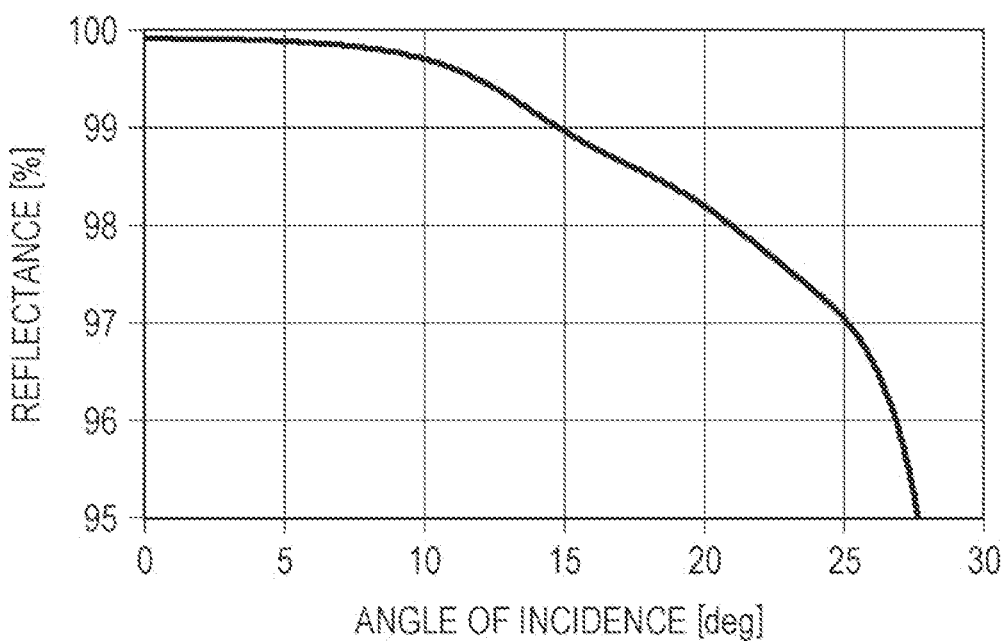
FIG. 12 is a diagram showing an example of a relationship between angle of incidence and reflectance at a wavelength of 940 nm.

FIG. 12 is a diagram showing an example of a relationship between the angle of incidence φ and reflectance at a wavelength $\lambda_A$ of 940 nm. As shown in FIG. 12, the reflectance slowly monotonically decreases in a very high wavelength region in which the reflectance ranges approximately from 95% to 99.9%. More specifically, in the wavelength region, the reflectance gradually decreases as the angle of incidence φ increases. The wavelength region is higher than or equal to approximately 940 nm and lower than or equal to approximately 1090 nm. The reflectance does not sharply decrease as shown in FIG. 10B. The reflectance is high in a case where the angle of incidence φ is relatively small, and is low in a case where the angle of incidence φ is relatively large. A method for designing a chirp DBR for obtaining a desired reflection spectrum such as that shown in FIG. 11 is described, for example, in H. A. Macleod, "Thin-film Optical Filters, 3rd Ed." (pp. 193-204) IoP Publishing (Bristol and Philadelphia).

As noted above, by providing points of inflection closer to a long-wavelength side than the local maximum point $P_{LM}$ of a reflection spectrum, changes in reflectance with respect to changes in the angle of incidence φ can be made slow. The local maximum point $P_{LM}$ and points of inflection of the reflection spectrum may be present in a wavelength region that exhibits a reflectance higher than or equal to 95%. Such a configuration can make changes slow with the reflectance kept high. The local maximum point $P_{LM}$ and points of inflection of the reflection spectrum may be present in a wavelength region that exhibits a reflectance higher than or equal to 90%. In the present embodiment, when there is one or more points of inflection, the reflectance slowly changes at least when the angle of incidence φ falls within a range of 0 degree to approximately 10 degrees. In particular, when there are two or more points of inflection, the reflectance slowly changes at least when the angle of incidence φ falls within a range of 0 degree to approximately 15 degrees. By thus providing two or more points of inflection, changes in reflectance with respect to changes in angle of incidence can be made slow in a wider angular range. Further, the slow changes in reflectance can be achieved while high reflectances are kept.

For comparison, the following describes relationships between the angle of emission θ and the length of propagation $L_p$ in cases where a conventional DBR and a DBR of the present embodiment are used as the mirror 30.

Figure 13:
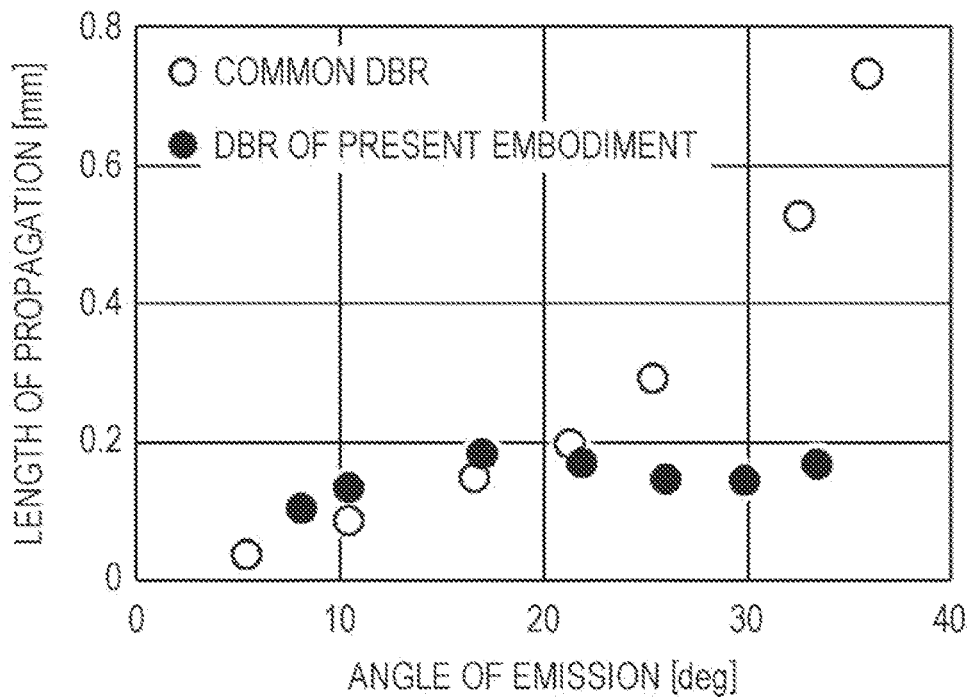
FIG. 13 is a diagram showing an example of a relationship between angle of emission and length of propagation.

FIG. 13 is a diagram showing an example of a relationship between the angle of emission θ and the length of propagation $L_p$. The open circles represent a case where the mirror 30 of a slow light waveguide 10 is formed from the conventional DBR according to the aforementioned example. The filled circles represent a case where the mirror 30 of a slow light waveguide 10 is formed from the chirp DBR according to the aforementioned example. The mirror 40 of the slow light waveguide 10 is formed from a conventional DBR different from the aforementioned example. The DBR has a structure in which eleven high-refractive-index layers and ten low-refractive-index layers are alternately stacked. The high-refractive-index layers have a refractive index of 2.28 and a thickness of 107 nm. The low-refractive-index layers have a refractive index of 1.47 and a thickness of 172 nm. The optical waveguide layer 20 has a refractive index of 1.68. Air, which is a medium on the side from which light is emitted, has a refractive index of 1.0.

As represented by the open circles, in the conventional DBR, the length of propagation $L_p$ increases as the angle of emission θ increases. On the other hand, as represented by the filled circles, it is found that in the chirp DBR of the present embodiment, the length of propagation $L_p$ does not greatly change even when the angle of emission θ increases. Thus, the chirp DBR of the present embodiment makes it possible to reduce the dependence of the length of propagation $L_p$ on the angle of emission θ. As long as the length of propagation $L_p$ is substantially constant regardless of the angle of emission θ, the beam line width Δθ of the emitted light shown in FIG. 7 is substantially constant with respect to the angle of emission θ, too. In the example shown in FIG. 13, the length of propagation $L_p$ is approximately 150 μm on average. As shown in FIG. 7, "Length of Propagation $L_p$≈150 μm" is equivalent to "Beam Line Width Δθ of Emitted Light≈0.1°". Accordingly, even when the angle of emission θ changes, the beam line width Δθ of the emitted light can be kept approximately 0.1 degree. This makes it possible to inhibit the resolving power of a scan from varying according to the angle of emission θ. Further, since the beam line width Δθ of the emitted light is 0.1 degree, a high resolving power can be kept regardless of the angle of emission θ.

Figure 14:
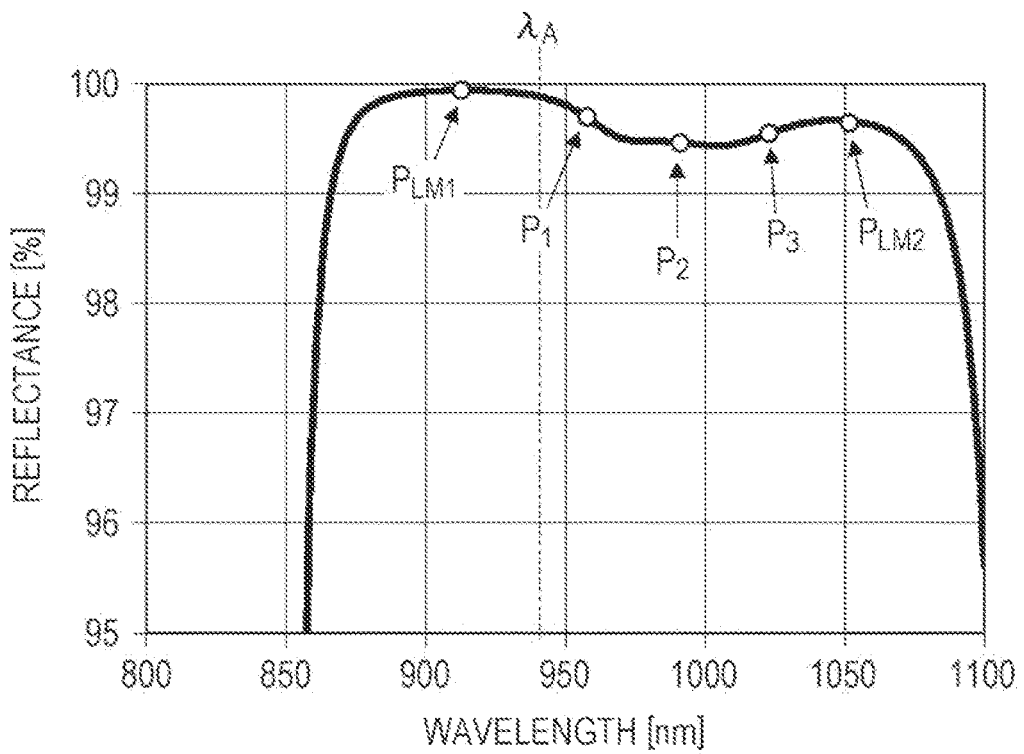
FIG. 14 is a diagram showing the reflection spectrum of another chirp DBR of the present embodiment at an angle of incidence of 0 degree.

Although, in the aforementioned example, the reflectance monotonically decreases on the long-wavelength side of the local maximum point $P_{LM}$, the reflectance does not necessarily need to monotonically decrease on the long-wavelength side of the local maximum point $P_{LM}$. FIG. 14 is a diagram showing the reflection spectrum of another chirp DBR of the present embodiment at an angle of incidence φ of 0 degree. In the example shown in FIG. 14, the reflection spectrum includes, in a wavelength region in which the reflectance is higher than or equal to 95%, a local maximum point $P_{LM1}$, a local maximum point $P_{LM2}$ located on a long-wavelength side of the local maximum point $P_{LM1}$, and points of inflection $P_1$ to $P_3$ located on the long-wavelength side of the local maximum point $P_{LM1}$ and a short-wavelength side of the local maximum point $P_{LM2}$. In the reflection spectrum, the reflectance decreases and then increases on the long-wavelength side of the local maximum point $P_{LM1}$ and the short-wavelength side of the local maximum point $P_{LM2}$ as the wavelength increases. That is, the reflectance does not monotonically decrease on the long-wavelength side of the local maximum point $P_{LM1}$. The reflectance monotonically decreases on a long-wavelength side of the local maximum point $P_{LM2}$. Even in this case, in a wavelength region in which the reflectance is extremely high ranging approximately from 99.5% to 99.9%, the reflectance slowly or, more specifically, gradually decreases as the angle of incidence φ increases. The wavelength region is higher than or equal to approximately 940 nm and lower than or equal to approximately 1000 nm.

As noted above, the slow light waveguide 10 according to the present embodiment makes it possible to reduce the dependence of the beam line width Δθ of emitted light on the angle of emission θ. Furthermore, even when the angle of emission θ changes, the beam line width Δθ of the emitted light can be kept narrow. This effect is brought about in a case where at least either the mirror 30 or 40 of the slow light waveguide 10 has the following reflection spectrum. The reflection spectrum includes, in a wavelength region in which a reflectance with respect to an angle of incidence φ of 0 degrees is higher than or equal to 90%, one local maximum point and first and second points of inflection located on a long-waveguide side of the local maximum point. A wavelength at the first point of inflection is shorter than a wavelength at the second point of inflection. The wavelength λ of light 22 that propagates through the optical waveguide layer 20 is a wavelength higher than or equal to the local maximum point and lower than or equal to the first point of inflection. The wavelength region may be included in a wavelength region higher than or equal to 0.8 μm and lower than or equal to 1.2 μm that may be used for the aforementioned LiDAR system. Either the mirror 30 or 40 may exhibit such a reflection spectrum, or both the mirrors 30 and 40 may exhibit such reflection spectra. Although, in the example shown in FIG. 2, light is emitted from the mirror 30 and light is reflected by the mirror 40, this example is not intended to impose any limitation. Light may be reflected by the mirror 30, and light may be emitted from the mirror 40. Alternatively, light may be emitted from both the mirrors 30 and 40.

In the present embodiment, by providing points of inflection closer to a long-wavelength side than the local maximum point $P_{LM}$ of a reflection spectrum, changes in reflectance with respect to changes in the angle of incidence φ can be made slow, and a region in which the reflectance slowly changes is utilized. Therefore, the wavelength λ of light 22 that propagates through the optical waveguide layer 20 is a wavelength represented by the following formula using the local maximum point $P_{LM}$ and the first point of inflection $P_1$:

$$(P_{LM}+P_1)/2<\lambda<P_1 \qquad (3)$$

EXAMPLES OF APPLICATION

Figure 15:
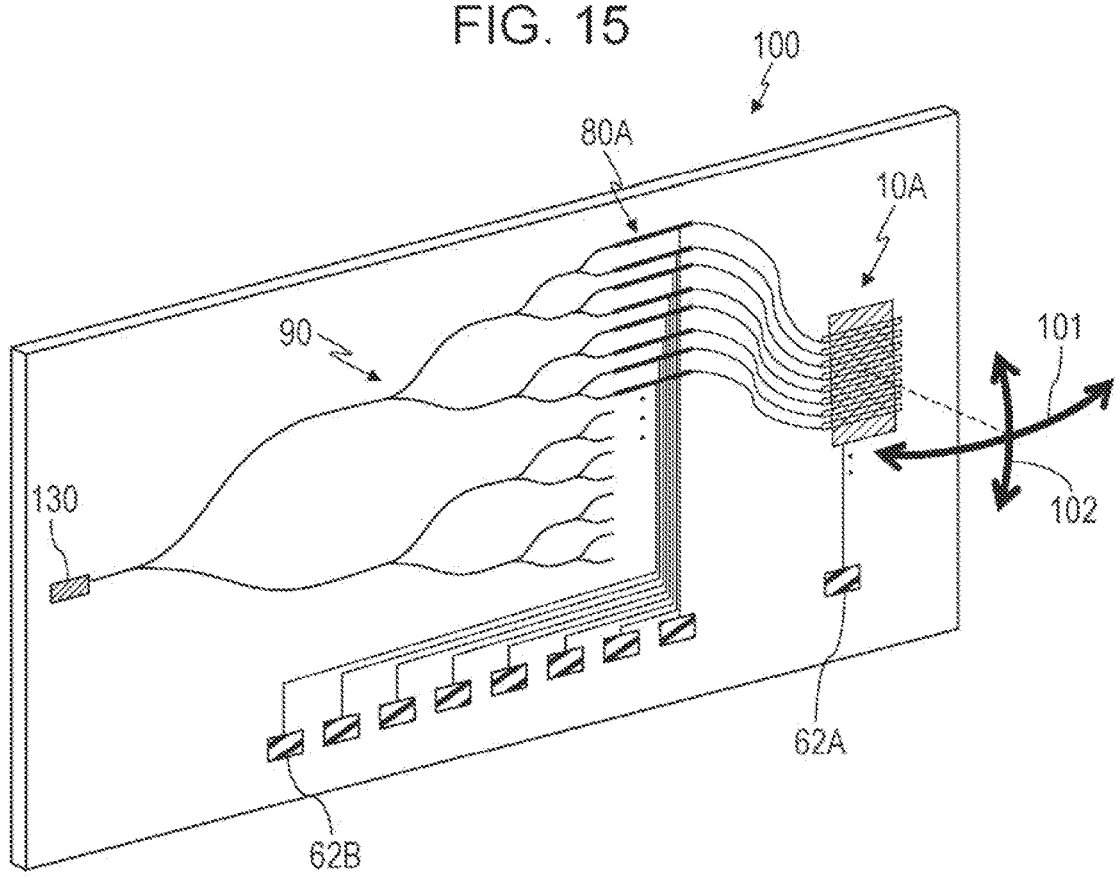
FIG. 15 is a diagram showing an example configuration of an optical scan device in which elements such as an optical divider, a waveguide array, a phase shifter array, and a light source are integrated on a circuit board.

FIG. 15 is a diagram showing an example configuration of an optical scan device 100 in which elements such as an optical divider 90, a waveguide array 10A, a phase shifter array 80A, and a light source 130 are integrated on a circuit board (e.g. a chip). The light source 130 may for example be a light-emitting element such as a semiconductor laser. In this example, the light source 130 emits single-wavelength light whose wavelength in free space is λ. The optical divider 90 divides the light from the light source 130 into lights and introduces the lights into waveguides of the plurality of phase shifters 80. In the example shown in FIG. 15, there are provided an electrode 62A and a plurality of electrodes 62B on the chip. The waveguide array 10A is supplied with a control signal from the electrode 62A. To the plurality of phase shifters 80 in the phase shifter array 80A, control signals are sent from the plurality of electrodes 62B, respectively. The electrode 62A and the plurality of electrodes 62B may be connected to a control circuit (not illustrated) that generates the control signals. The control circuit may be provided on the chip shown in FIG. 15 or may be provided on another chip in the optical scan device 100.

As shown in FIG. 15, an optical scan over a wide range can be achieved through a small-sized device by integrating all components on the chip. For example, all of the components shown in FIG. 15 can be integrated on a chip measuring approximately 2 mm by 1 mm.

Figure 16:
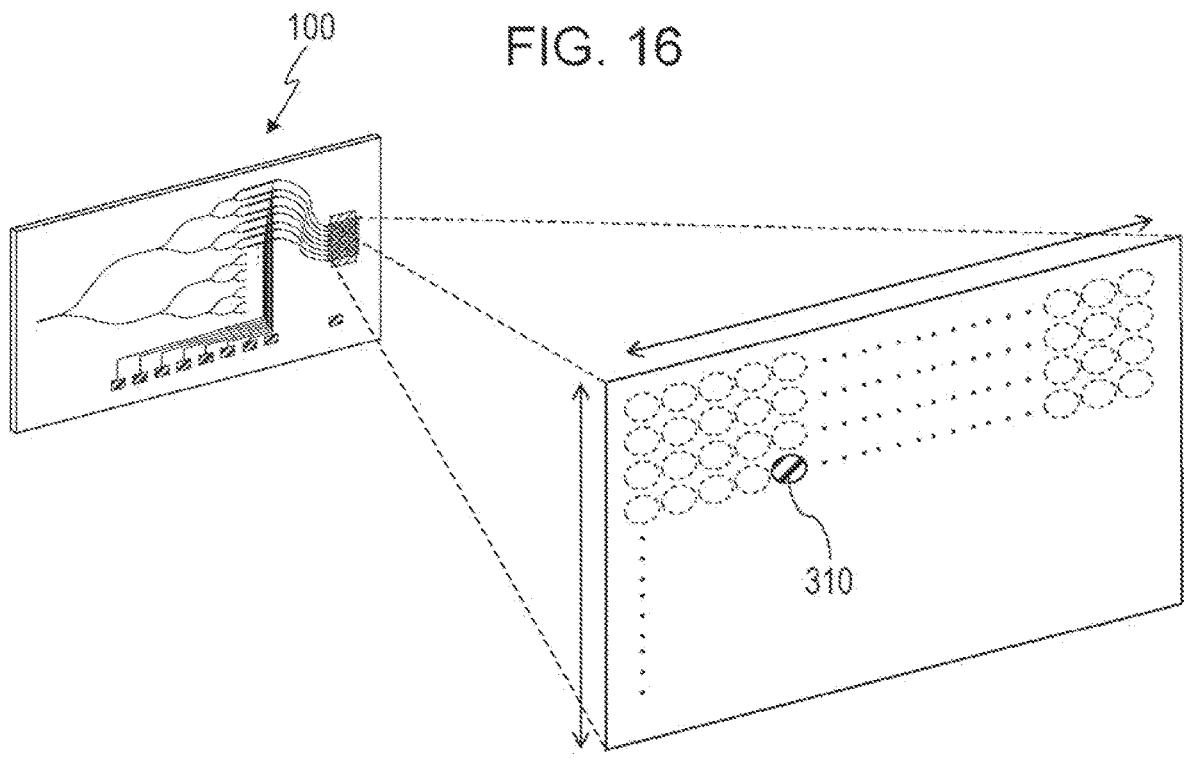
FIG. 16 is a schematic view showing how a two-dimensional scan is being executed by irradiating a distant place with a light beam such as a laser from the optical scan device.

FIG. 16 is a schematic view showing how a two-dimensional scan is being executed by irradiating a distant place with a light beam such as a laser from the optical scan device 100. A two-dimensional can is executed by moving a beam spot 310 in horizontal and vertical directions. For example, a two-dimensional ranging image can be acquired by a combination with a publicly-known TOF (time-of-flight) method. The TOF method is a method for, by observing light reflected from a physical object irradiated with a laser, calculating the time of flight of the light to figure out the distance.

Figure 17:
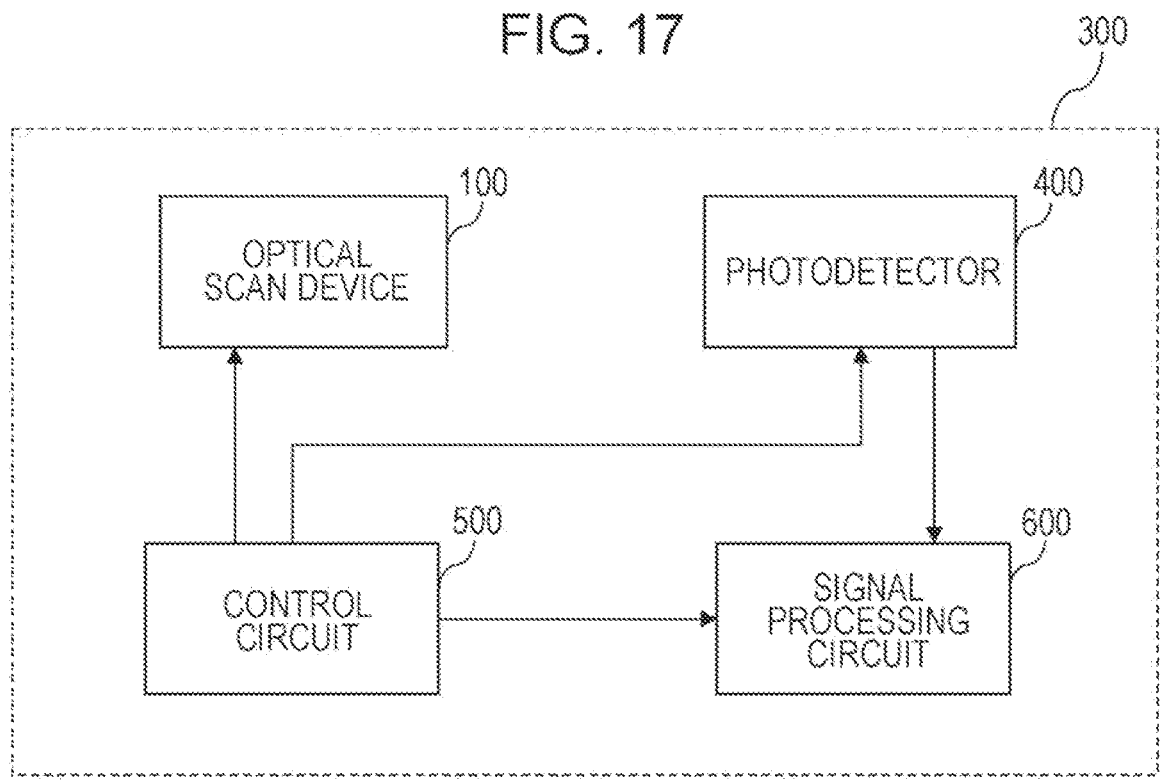
FIG. 17 is a block diagram showing an example configuration of a LiDAR system that is capable of generating a ranging image.

FIG. 17 is a block diagram showing an example configuration of a LiDAR system 300 serving as an example of a photodetection system that is capable of generating such a ranging image. The LiDAR system 300 includes an optical scan device 100, a photodetector 400, a signal processing circuit 600, and a control circuit 500. The photodetector 400 detects light emitted from the optical scan device 100 and reflected from a physical object. The photodetector 400 may for example be an image sensor that has sensitivity to the wavelength $\lambda$ of light that is emitted from the optical scan device 100 or a photodetector including a photo-sensitive element such as a photodiode. The photodetector 400 outputs an electrical signal corresponding to the amount of light received. The signal processing circuit 600 calculates the distance to the physical object on the basis of the electrical signal outputted from the photodetector 400 and generates distance distribution data. The distance distribution data is data that represents a two-dimensional distribution of distance (i.e. a ranging image). The control circuit 500 is a processor that controls the optical scan device 100, the photodetector 400, and the signal processing circuit 600. The control circuit 500 controls the timing of irradiation with a light beam from the optical scan device 100 and the timing of exposure and signal readout of the photodetector 400 and instructs the signal processing circuit 600 to generate a ranging image.

The frame rate at which a ranging image is acquired by a two-dimensional scan can be selected, for example, from among 60 fps, 50 fps, 30 fps, 25 fps, 24 fps, or other frame rates, which are commonly used to acquire moving images. Further, in view of application to an onboard system, a higher frame rate leads to a higher frequency of acquisition of a ranging image, making it possible to accurately detect an obstacle. For example, in the case of a vehicle traveling at 60 km/h, a frame rate of 60 fps makes it possible to acquire an image each time the vehicle moves approximately 28 cm. A frame rate of 120 fps makes it possible to acquire an image each time the vehicle moves approximately 14 cm. A frame rate of 180 fps makes it possible to acquire an image each time the vehicle moves approximately 9.3 cm.

The time required to acquire one ranging image depends on the speed of a beam scan. For example, in order for an image whose number of resolvable spots is 100 by 100 to be acquired at 60 fps, it is necessary to perform a beam scan at 1.67 µs per point. In this case, the control circuit 500 controls the emission of a light beam by the optical scan device 100 and the storage and readout of a signal by the photodetector 400 at an operating speed of 600 kHz.

Example of Application to Optical Receiver Device

Each of the optical scan devices of the present disclosure can also be used as an optical receiver device of similar configuration. The optical receiver device includes a waveguide array 10A which is identical to that of the optical scan device and a first adjusting element that adjusts the direction of light that can be received. Each of the first mirrors 30 of the waveguide array 10A transmits light falling on a side thereof opposite to a first reflecting surface from the third direction. Each of the optical waveguide layers 20 of the waveguide array 10A causes the light transmitted through the first mirror 30 to propagate in the second direction. The direction of light that can be received can be changed by the first adjusting element changing at least one of the refractive index of the optical waveguide layer 20 of each waveguide element 10, the thickness of the optical waveguide layer 20 of each waveguide element 10, or the wavelength of light. Furthermore, in a case where the optical receiver device includes a plurality of phase shifters 80 or 80a and 80b which are identical to those of the optical scan device and a second adjusting element that varies differences in phase among lights that are outputted through the plurality of phase shifters 80 or 80a and 80b from the plurality of waveguide elements 10, the direction of light that can be received can be two-dimensionally changed.

For example, an optical receiver device can be configured such that the light source 130 of the optical scan device 100 shown in FIG. 15 is substituted by a receiving circuit. When light of wavelength $\lambda$ falls on the waveguide array 10A, the light is sent to the optical divider 90 through the phase shifter array 80A, is finally concentrated on one place, and is sent to the receiving circuit. The intensity of the light concentrated on that one place can be said to express the sensitivity of the optical receiver device. The sensitivity of the optical receiver device can be adjusted by adjusting elements incorporated separately into the waveguide array 10A and the phase shifter array 80A. The optical receiver device is opposite in direction of the wave number vector (in the drawing, the bold arrow) shown, for example, in FIG. 4. Incident light has a light component acting in the direction (in the drawing, the X direction) in which the waveguide elements 10 extend and a light component acting in the array direction (in the drawing, the Y direction) of the waveguide elements 10. The sensitivity to the light component acting in the X direction can be adjusted by the adjusting element incorporated into the waveguide array 10A. Meanwhile, the sensitivity to the light component acting in the array direction of the waveguide elements 10 can be adjusted by the adjusting element incorporated into the phase shifter array 80A. $\theta$ and $\alpha_0$ shown in FIG. 4 are found from the phase difference $\Delta\varphi$ of light and the refractive index $n_w$ and thickness d of the optical waveguide layer 20 at which the sensitivity of the optical receiver device reaches its maximum. This makes it possible to identify the direction of incidence of light.

The aforementioned embodiments can be combined as appropriate.

Finally, the aforementioned optical device is summarized in the following items.

An optical device according to a first item includes a first mirror having a first reflecting surface and extending along a first direction, a second mirror having a second reflecting surface that faces the first reflecting surface and extending along the first direction, and an optical waveguide layer, located between the first mirror and the second mirror, that causes light to propagate along the first direction. A transmittance of the first mirror is higher than a transmittance of the second mirror. A reflection spectrum of at least either the first mirror or the second mirror with respect to light arriving from a direction normal to the reflecting surface includes, in a wavelength region in which a reflectance is higher than or equal to 90%, a local maximum point and first and second points of inflection located closer to a long-wavelength side than the local maximum point.

In this optical device, the reflectance of at least either the first mirror or the second mirror slowly decreases as the angle of incidence of light increases. This makes it possible to inhibit the beam line width of light that is emitted from at least either the first mirror or the second mirror from varying according to the angle of emission.

An optical device according to a second item is directed to the optical device according to the first item, wherein a wavelength at the first point of inflection is shorter than a wavelength at the second point of inflection, and a wavelength $\lambda$ of the light that propagates through the optical waveguide layer is a wavelength higher than or equal to the local maximum point and lower than or equal to the first point of inflection.

In this optical device, the reflectance of at least either the first mirror or the second mirror gradually decreases as the angle of incidence of light increases. This makes it possible to inhibit the beam line width of emitted light from varying according to the angle of emission.

An optical device according to a third item is directed to the optical device according to the first or second item, wherein the wavelength region is higher than or equal to 0.8 µm and lower than or equal to 1.2 µm.

This optical device can be applied to a LiDAR system.

An optical device according to a fourth item is directed to the optical device according to the first to third items, wherein at least either the first mirror or the second mirror includes a distributed Bragg reflector having a laminated structure.

This optical device can bring about the same effects as those of the optical device according to any of the first to third items.

An optical device according to a fifth item is directed to the optical device according to the fourth item, wherein the distributed Bragg reflector is a chirp DBR.

This optical device can bring about the same effects as those of the optical device according to the fourth item.

An optical device according to a sixth item is directed to the optical device according to the first item, wherein the first mirror has the reflection spectrum.

This optical device makes it possible to inhibit the beam line width of light that is emitted from the first mirror from varying according to the angle of emission.

An optical scan device and an optical receiver device according to the present disclosure are applicable, for example, to a use such as a LiDAR system that is mounted on a vehicle such as an automobile, a UAV, or an AGV.

What is claimed is:

1. An optical device comprising:
   a first mirror having a first reflecting surface and extending along a first direction;
   a second mirror having a second reflecting surface that faces the first reflecting surface and extending along the first direction;
   an optical waveguide layer, located between the first mirror and the second mirror, that causes light to propagate along the first direction, wherein:
   a transmittance of the first mirror is higher than a transmittance of the second mirror,
   a reflection spectrum of at least either the first mirror or the second mirror with respect to light arriving from a direction normal to the reflecting surface includes, in a wavelength region in which a reflectance is higher than or equal to 90%, a local maximum point and first and second points of inflection located closer to a long-wavelength side than the local maximum point, and
   a reflectance monotonically decreases on a long-wavelength side of the local maximum point to at least the second point of inflection.

2. The optical device according to claim 1, wherein a wavelength at the first point of inflection is shorter than a wavelength at the second point of inflection, and a wavelength $\lambda$ of the light that propagates through the optical waveguide layer is a wavelength higher than or equal to the local maximum point and lower than or equal to the first point of inflection.

3. The optical device according to claim 1, wherein the wavelength region is higher than or equal to 0.8 µm and lower than or equal to 1.2 µm.

4. The optical device according to claim 1, wherein at least either the first mirror or the second mirror includes a distributed Bragg reflector having a laminated structure.

5. The optical device according to claim 4, wherein the distributed Bragg reflector is a chirp DBR.

6. The optical device according to claim 1, wherein the first mirror has the reflection spectrum.

7. An optical scan device comprising:
   a first mirror having a first reflecting surface and extending along a first direction;
   a second mirror having a second reflecting surface that faces the first reflecting surface and extending along the first direction; and
   an optical waveguide layer, located between the first mirror and the second mirror, that causes light to propagate along the first direction, wherein;
   a transmittance of the first mirror is higher than a transmittance of the second mirror,
   a reflection spectrum of at least either the first mirror or the second mirror with respect to light arriving from a direction normal to the reflecting surface includes, in a wavelength region in which a reflectance is higher than or equal to 90%, a local maximum point $P_{LM}$ and first and second points of inflection $P_1$ and $P_2$ located closer to a long-wavelength side than the local maximum point, and light emitted via the first mirror is polarized to do a scan on a space, and
   a reflectance monotonically decreases on a long-wavelength side of the local maximum point $P_{LM}$ to at least the second point of inflection $P_2$.

8. The optical scan device according to claim 7, wherein the scan includes using a wavelength $\lambda$ that satisfies $$(P_{LM}+P_1)/2<\lambda<P_1.$$

* * * * *